(12) United States Patent
Anzawa et al.

(10) Patent No.: US 12,463,906 B2
(45) Date of Patent: Nov. 4, 2025

(54) MANAGEMENT APPARATUS AND QUALITY CONTROL APPARATUS

(71) Applicant: NTT DOCOMO, INC., Chiyoda-ku (JP)

(72) Inventors: Masashi Anzawa, Chiyoda-ku (JP); Hiroki Ishizuka, Chiyoda-ku (JP); Daiki Takeda, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 378 days.

(21) Appl. No.: 17/996,408

(22) PCT Filed: Apr. 23, 2021

(86) PCT No.: PCT/JP2021/016442
§ 371 (c)(1),
(2) Date: Oct. 17, 2022

(87) PCT Pub. No.: WO2021/230044
PCT Pub. Date: Nov. 18, 2021

(65) Prior Publication Data
US 2023/0216799 A1   Jul. 6, 2023

(30) Foreign Application Priority Data

May 13, 2020   (JP) ................. 2020-084467

(51) Int. Cl.
*H04L 47/2416*   (2022.01)
*A63F 13/358*   (2014.01)
(Continued)

(52) U.S. Cl.
CPC ........ *H04L 47/2416* (2013.01); *A63F 13/358* (2014.09); *H04L 47/2483* (2013.01); *H04L 67/131* (2022.05); *H04W 4/00* (2013.01)

(58) Field of Classification Search
CPC ............... H04L 67/131; H04L 47/2483; H04L 47/2416; H04W 4/00; A63F 13/358
See application file for complete search history.

(56) References Cited

FOREIGN PATENT DOCUMENTS

| JP | 2003249955 A | * | 9/2003 |
| JP | 2013-13027 A | | 1/2013 |
| JP | 2013013027 A | * | 1/2013 |

OTHER PUBLICATIONS

International Search Report (with English translation) mailed on Jul. 20, 2021 in PCT/JP2021/016442 filed on Apr. 23, 2021.
(Continued)

*Primary Examiner* — Tonia L Dollinger
(74) *Attorney, Agent, or Firm* — Oblon, McClelland, Maier & Neustadt, L.L.P.

(57) ABSTRACT

A management apparatus includes a receiver configured to receive, for each of terminal devices belonging to a first group, a corresponding piece of quality information based on a quality available to the respective terminal device in a communication service; a determiner configured to determine, based on the corresponding piece of quality information for each terminal device, whether the first group includes a second group of two or more terminal devices, the second group satisfying a predetermined condition, the predetermined condition including a quality condition in which the communication service is available at a quality higher than or equal to a predetermined quality; and a situation controller configured to, based on a result of a determination made by the determiner being affirmative, cause a first situation in which the second group receives the communication service at a quality higher than or equal to the predetermined quality.

11 Claims, 8 Drawing Sheets

(51) Int. Cl.
*H04L 47/2483* (2022.01)
*H04L 67/131* (2022.01)
*H04W 4/00* (2018.01)

(56) References Cited

OTHER PUBLICATIONS

Japanese Office Action issued Dec. 5, 2023 in Japanese Patent Application No. 2022-521804 (with unedited computer generated English translation), 7 pages.
Japanese Office Action issued Aug. 15, 2023 in Japanese Application 2022-521804 (with unedited computer-generated English translation), 7 pages.

* cited by examiner

MANAGEMENT APPARATUS AND QUALITY CONTROL APPARATUS

TECHNICAL FIELD

The present invention relates to a management apparatus and to a quality control apparatus.

BACKGROUND ART

Patent Document 1 discloses an online game system for managing a plurality of terminal devices as a group of game players based on actual delay time in communication.

RELATED ART DOCUMENT

Patent Document

Patent Document 1: Japanese Patent Application Laid-Open Publication No. 2013-13027

SUMMARY OF THE INVENTION

Problem to be Solved by the Invention

When a terminal device using the above-mentioned system receives a communication service such as a quality of service (QoS) control service, etc., a quality of the communication service may be changeable. Consequently, there is a probability that a quality of a communication service provided for two or more terminal devices that are used for an online game can be changed to a quality higher than, or a quality equal to, a predetermined quality corresponding to a recommended setting for the game.

Therefore, when a quality of a communication service received by a terminal device is changeable, it is desirable to provide a technique enabling two or more terminal devices used for an online game to receive a communication service at a quality higher than or equal to a predetermined quality.

Furthermore, such a technique is desirable not only in an online game system, but also in a system in which two or more terminal devices exchange information while receiving a communication service.

An object of the present invention is to provide a technique enabling two or more terminal devices to receive a communication service at a quality higher than or equal to a predetermined quality.

Means for Solving the Problem

A management apparatus according to one aspect of the present invention includes: a receiver configured to receive, for each of a plurality of terminal devices belonging to a first group, a corresponding piece of quality information based on a quality available to the respective terminal device in a communication service; a determiner configured to determine, based on the corresponding piece of quality information for each of the plurality of terminal devices, whether the first group includes a second group of two or more terminal devices, the second group satisfying a predetermined condition, the predetermined condition including a quality condition in which the communication service is available at a quality higher than or equal to a predetermined quality; and a situation controller configured to, based on a result of a determination made by the determiner being affirmative, cause a first situation in which the second group receives the communication service at a quality higher than or equal to the predetermined quality.

A quality control apparatus according to another aspect of the present invention includes: a provider configured to provide, based on a terminal device satisfying a participation condition for an event requiring a communication service, the terminal device with the communication service at a quality higher than or equal to a recommended quality that is recommended for the event; and an informer configured to inform, based on the terminal device satisfying the participation condition, the terminal device that the provider provides the terminal device with the communication service at the quality higher than or equal to the recommended quality.

Effects of Invention

According to the present invention, it is possible to assist two or more terminal devices in receiving a communication service at a quality higher than or equal to a predetermined quality.

MODES FOR CARRYING OUT THE INVENTION

A: First Embodiment

A1: Communication System 1

Figure 1:
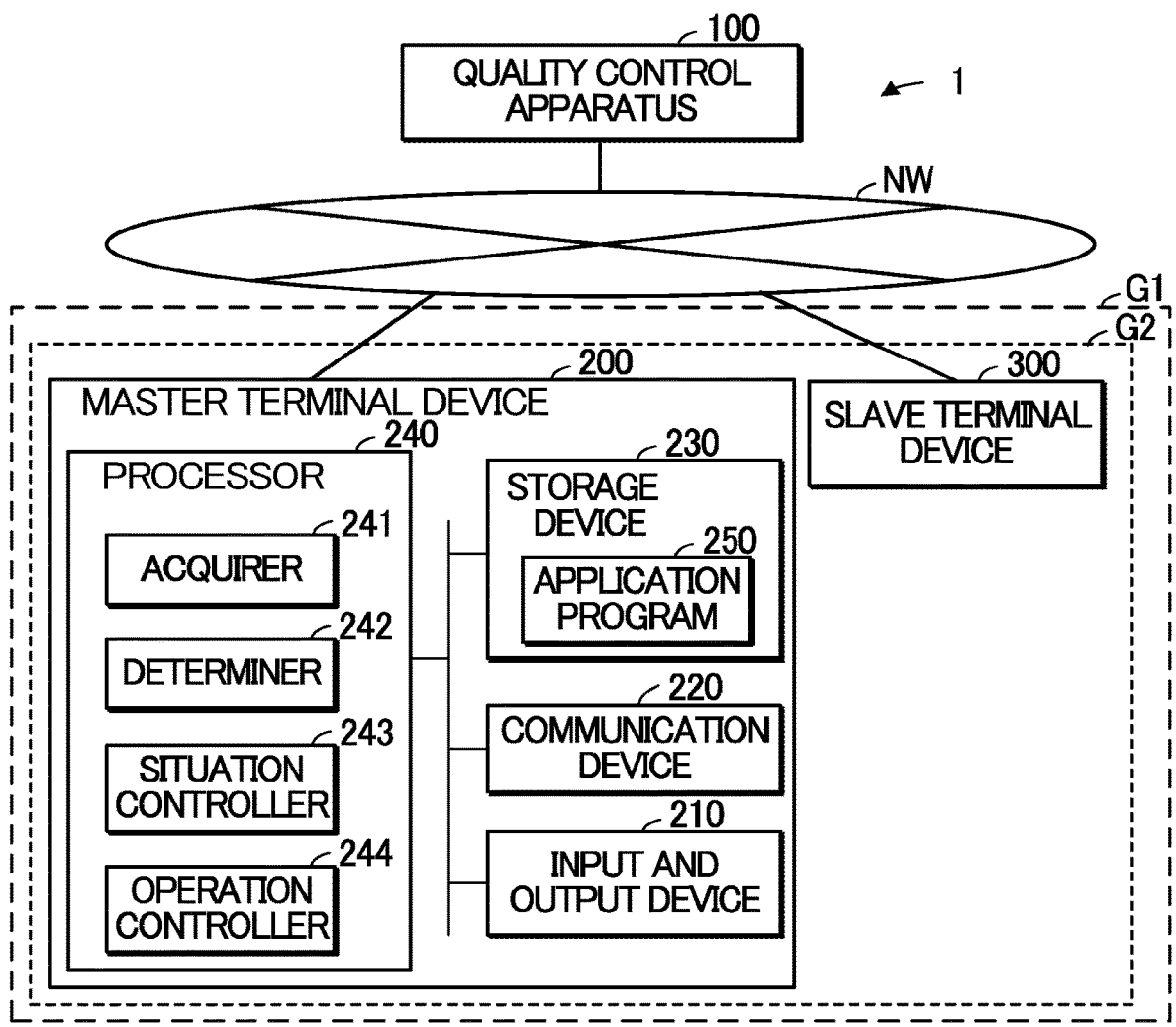
FIG. 1 is a diagram showing a communication system 1.

FIG. 1 is a diagram showing a communication system 1. The communication system 1 includes a first group G1 of terminal devices and a quality control apparatus 100. The first group G1 includes a master terminal device 200 and a slave terminal device 300. The first group G1 may include two or more slave terminal devices 300 instead of one slave terminal device 300.

The quality control apparatus 100, the master terminal device 200, and the slave terminal device 300 are capable of communicating with each other via a network NW. The network NW is a communication line such as a mobile communication network, etc. The network NW includes a wired network or a wireless network. The network NW may include both a wired network and a wireless network.

The master terminal device 200 and the slave terminal device 300 are each capable of receiving an online competition game service. The online competition game service is a service for providing an online competition game.

The master terminal device 200 and the slave terminal device 300 receive the online competition game service while executing peer-to-peer (P2P) communication with each other. When the online competition game service is provided by a game server, the master terminal device 200 and the slave terminal device 300 may receive the online competition game service by communicating with the game server.

The online competitive game service is an example of a specific service. The specific service is not limited to the online competitive game service. The specific service may be a teleconferencing service or a videoconferencing service, for example. A communication for receiving the online competitive game service is an example of a predetermined communication. The predetermined communication is not limited to the communication for receiving the online competitive game service. The predetermined communications may be a communication for receiving a teleconferencing service or a communication for receiving a teleconferencing service, for example.

The master terminal device 200 and the slave terminal device 300 receive a communication service from the quality control apparatus 100. The communication service is a QoS control service, for example.

The quality control apparatus 100 controls the quality of the communication service. The quality of the communication service affects, for example, delay time in communication. For example, the higher the quality of the communication service, the shorter the delay time. The quality of the communication service affects speed of the communication, frame rate, throughput, packet loss rate, etc. For example, the higher the quality of the communication service, the higher the speed of the communication. The higher the quality of the communication service, the higher the frame rate. The higher the quality of the communication service, the greater the throughput. The higher the quality of the communication service, the lower the packet loss rate. The quality of the communication service received by the master terminal device 200 is referred to as a "first quality." The quality of the communication service received by the slave terminal device 300 is referred to as a "second quality." To enhance fairness to the online competition game, it is desirable that the first quality and the second quality be higher than or equal to a predetermined quality. The communication system 1 causes a situation in which both the first quality and the second quality are set to be higher than or equal to the predetermined quality.

A2: Quality Control Apparatus 100

The quality control apparatus 100 is an information processing apparatus such as a server, etc. The quality control apparatus 100 may include a plurality of information processing apparatuses. The information processing apparatus includes a processor such as a central processing unit (CPU), a storage device configured to store a program, and a communication device. The processor reads the program from the storage device. The processor executes the program to control an operation executed by the quality control apparatus 100. For example, the processor communicates with each of the master terminal device 200 and the slave terminal device 300 via the communication device.

The quality control apparatus 100 is used by the master terminal device 200 and the slave terminal device 300. In a case in which a plurality of quality control apparatuses 100 is present, a quality control apparatus 100 used by the slave terminal device 300 may be different from a quality control apparatus 100 used by the master terminal device 200.

The quality control apparatus 100 controls a QoS of communications in the network NW. The quality control apparatus 100 is capable of providing the QoS control service to both the master terminal device 200 and the slave terminal device 300. The QoS control service is a service for performing QoS control.

The QoS control service includes a priority control service or a bandwidth control service, for example. The QoS control service may include both the priority control service and the bandwidth control service. The priority control service is a service for preferentially transferring packets related to a specific communication, for example. When the priority control service is executed, reduction of delay time, improvement of throughput, and speeding up of communication are realized in the specific communication. The bandwidth control service is a service for adjusting a bandwidth used for communication. When the bandwidth of the communication is expanded by the bandwidth control service, reduction of delay time, improvement of throughput, and speeding up of communication are realized in the communication, for example. The QoS control service is not limited to the priority control service and the bandwidth control service. The QoS control service, the priority control service, and the bandwidth control service are each an example of the communication service.

The quality control apparatus 100 is capable of adjusting the quality of the QoS control service. The quality of the QoS control service is classified by the duration of delay time, for example. The quality of the QoS control service may be classified by an indicator, which is different from the duration of delay time, such as throughput, speed of communication, frame rate, or packet loss rate, for example. The shorter the delay time, the higher the quality of QoS control service. The delay time is indicated by an indicator such as a round trip time (RTT). The indicator regarding the delay time is not limited to the RTT. For example, the quality of the QoS control service depends on degree of communication congestion in a communication area and the contents of a contract for the QoS control service.

In response to receiving an inquiry about the quality of the QoS control service, the quality control apparatus 100 transmits a response to the inquiry.

A3: Master Terminal Device 200

The master terminal device 200 is a freely selected information processing device. The master terminal device 200 is a portable information processing device, for example. The portable information processing device is a smart phone, a notebook personal computer, a wearable terminal device, or a tablet terminal device, etc. The master terminal device 200 may be a stationary information processing device such as a personal computer, etc.

The master terminal device 200 includes an input and output device 210, a communication device 220, a storage device 230, and a processor 240. Elements of the master terminal device 200 are interconnected via one or more buses. Each element of the master terminal device 200 is constituted by one or more devices. One or some of the elements of the master terminal device 200 may be omitted.

The input and output device 210 includes a touch panel. The input and output device 210 may include a plurality of operation keys in addition to the touch panel. The input and output device 210 may include the plurality of operation keys and a display without including the touch panel. The input and output device 210 receives an operation performed by a user. The input and output device 210 displays various kinds of information.

The communication device 220 communicates with each of the quality control apparatus 100 and the slave terminal device 300 via the network NW.

The storage device 230 is a recording medium readable by the processor 240. The storage device 230 includes, for example, a nonvolatile memory and a volatile memory. The nonvolatile memory is, for example, a read only memory (ROM), an erasable programmable read only memory (EPROM), and an electrically erasable programmable read only memory (EEPROM). The volatile memories is, for example, a random access memory (RAM). The storage device 230 stores an application program 250. The application program 250 is used to provide the online competitive game service.

The processor 240 is an example of a management apparatus. The processor 240 includes, for example, one or more processors. For example, the processor 240 includes one or more CPUs. One, some, or all of functions of the processor 240 may be implemented by a circuit such as a digital signal processor (DSP), an application specific integrated circuit (ASIC), a programmable logic device (PLD), a field programmable gate array (FPGA), etc.

The processor 240 reads the application program 250 from the storage device 230. The processor 240 executes the application program 250 to realize an acquirer 241, a determiner 242, a situation controller 243, and an operation controller 244.

The acquirer 241 configured to receive, for each of a plurality of terminal devices belonging to the first group G1, a corresponding piece of quality information via the communication device 220. The plurality of terminal devices belonging to the first group G1 comprises the master terminal device 200 and the slave terminal device 300. The piece of quality information is a piece of information based on a quality of the QoS control service available to the corresponding terminal device. The piece of quality information indicates, for example, the quality of the QoS control service available to the corresponding terminal device. The piece of quality information may indicate whether the corresponding terminal device is capable of using the QoS control service at a predetermined quality. The acquirer 241 is an example of a receiver. The acquirer 241 may be configured by an acquisition circuit or a receiving circuit.

The determiner 242 determines, based on the pieces of quality information, whether the first group G1 includes a second group G2. The second group G2 is a group of two or more terminal devices belonging to the first group G1. The second group G2 is a group satisfying a predetermined condition. The predetermined condition is a condition for a group of two or more terminal devices belonging to the first group G1 to receive the QoS control service at a quality higher than or equal to the predetermined quality. In addition, the predetermined condition is a condition for a group of two or more terminal devices belonging to the first group G1 to receive a specific service such as the online competition game service, etc.

The predetermined condition includes a quality condition in which the QoS control service is available at a quality higher than or equal to the predetermined quality. The predetermined quality is, for example, a recommended quality that is recommended when the QoS control service is used in a situation in which the online competitive game is played.

An example of the recommended quality is a quality of the QoS control service by which a maximum time of a RTT is limited to 50 ms. The recommended quality is not limited to the quality described above, and the recommended quality may be, for example, a quality of the QoS control service by which the maximum time of the RTT is limited to 30 ms. The predetermined quality may be lower than the recommended quality by a predetermined level. For example, in a case in which the recommended quality is a quality of the QoS control service by which the maximum time of the RTT is limited to 50 ms, the predetermined quality is a quality of the QoS control service by which the maximum duration of the RTT is limited to 70 ms. In this case, the predetermined level corresponds to a difference (20 ms) of the maximum times of the RTT.

A situation in which the online competitive game is played means a situation in which the online competitive game service is provided. The situation in which the online competitive game is played is an example of a second situation in which the predetermined communication (for example, a communication for receiving the online competitive game service) is performed. The second situation is not limited to the situation in which the online competitive game is played. The second situation may be a situation in which a teleconferencing service is provided or a situation in which a teleconferencing service is provided, for example.

The predetermined condition (the condition for a group of two or more terminal devices belonging to the first group G1 to receive the QoS control service at a quality higher than or equal to the predetermined quality) may include one or more conditions different from the quality condition. For example, the predetermined condition may further include a condition in which the number of two or more terminal devices belonging to the second group G2 is greater than or equal to a predetermined number. The predetermined number is less than or equal to the number of terminal devices belonging to the first group G1. The predetermined condition may not include a condition different from the quality condition. The determiner 242 may be constituted by a determination circuit.

The situation controller 243 causes, based on a result of a determination made by the determiner 242 being affirmative, a situation in which the second group G2 receives the QoS control service at a quality higher than or equal to the predetermined quality. For example, based on the result of the determination made by the determiner 242 being affirmative, the situation controller 243 executes predetermined processing to cause the situation in which the second group G2 receives the QoS control service at the quality higher than or equal to the predetermined quality. Hereinafter, the situation, in which the second group G2 receives the QoS control service at the quality higher than or equal to the predetermined quality, may be referred to as a "first situation."

The predetermined processing includes, for example, first processing to urge the two or more terminal devices belonging to the second group G2 to receive the QoS control service at a quality higher than or equal to the predetermined quality. The first processing may be referred to as an example of the predetermined processing.

The predetermined processing may include second processing to urge the quality control apparatus 100 to provide the two or more terminal devices belonging to the second group G2 with the QoS control service at a quality higher than or equal to the predetermined quality. The second processing may be referred to as an example of the predetermined processing.

Based on the result of the determination made by the determiner 242 being affirmative in a situation in which the predetermined quality is the recommended quality, the situation controller 243 may execute third processing to cause a situation (an example of the first situation) in which the terminal devices of the second group G2 receive the QoS control service at the recommended quality. The third processing is included in the predetermined processing. The third processing may be referred to as an example of the predetermined processing. An example of the recommended quality is the quality recommended when the QoS control services are used in the situation in which the online competitive game is played, as described above.

Based on the result of the determination made by the determiner 242 being affirmative, the situation controller 243 may execute fourth processing to cause a situation (an example of the first situation) in which the two or more terminal devices belonging to the second group G2 receive the QoS control service at a specified quality. The fourth processing is included in the predetermined processing. The fourth processing may be referred to as an example of the predetermined processing. The specific quality is, for example, the lowest quality from among qualities of the QoS control service available to each of the two or more terminal devices belonging to the second group G2.

Based on the result of the determination made by the determiner 242 being affirmative, the situation controller 243 may cause a situation in which the two or more terminal devices belonging to the second group G2 receive the online competition game service. For example, based on the result of the determination made by the determiner 242 being affirmative, the situation controller 243 may execute specific processing to cause a situation in which the two or more terminal devices belonging to the second group G2 receive the online competition game service. The specific processing is, for example, notification processing to notify the second group G2 of information based on the result of the determination made by the determiner 242. The situation controller 243 executes the notification processing to cause the situation in which the two or more terminal devices belonging to the second group G2 receive the online competition game service.

Based on the result of the determination made by the determiner 242 being affirmative, the situation controller 243 does not cause a situation in which a terminal device, which does not belong to the second group G2, among the plurality of terminal devices belonging to the first group G1, receives the QoS control service at a quality higher than or equal to the predetermined quality.

Based on the result of the determination made by the determiner 242 being negative, the situation controller 243 does not cause a situation in which the plurality of terminal devices belonging to the first group G1 receives the QoS control service at a quality higher than or equal to the predetermined quality.

The situation controller 243 may be constituted by a situation control circuit.

The operation controller 244 controls various operations. For example, the operation controller 244 provides the online competition game service for the user while performing P2P communication with the slave terminal device 300 via the communication device 220. The operation controller 244 may include one or more operation controllers.

A4: Slave Terminal Device 300

The slave terminal device 300 is a freely selected information processing device. The slave terminal device 300 is a portable information processing device, for example. The slave terminal device 300 may be a stationary information processing device. The slave terminal device 300 includes elements similar to the elements of the master terminal device 200. For example, the slave terminal device 300 includes an input and output device, a communication device, a storage device, and a processor.

A5: Description of Operation

Figure 2:
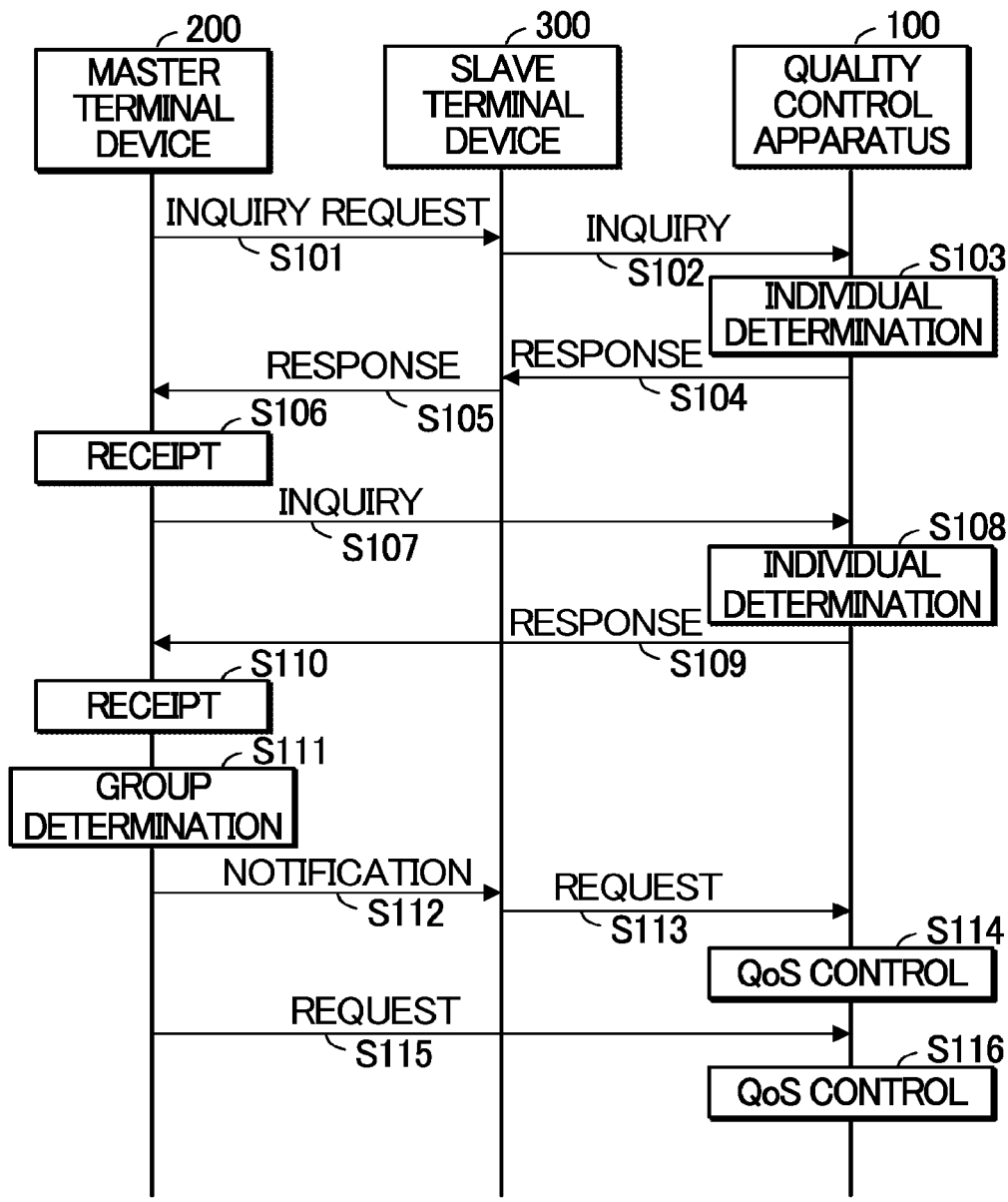
FIG. 2 is a sequence diagram showing an operation of the communication system 1.

FIG. 2 is a sequence diagram showing an operation of the communication system 1. Hereinafter, the quality of the QoS control service is indicated by "level." The level is represented by a numerical value. The greater the numerical value indicative of the level, the higher the quality of the QoS control service. For example, "level 1" means a quality of the QoS control service by which the maximum time of the RTT is limited to 100 ms. "Level 2" means a quality of the QoS control service by which the maximum time of the RTT is limited to 80 ms. The quality of the QoS control service may be higher as the numerical value indicative of the level decreases. The level may be indicated by an indicator different from a numerical value.

The application program 250 includes a user list showing information on players of the online competition game. In the online competition game, an agreement has been made in advance that a user of the slave terminal device 300 will become an opponent of a user of the master terminal device 200.

Step S101: Inquiry Request

Based on the input and output device 210 receiving a specific user operation in a situation in which the application program 250 is executed, step S101 is executed.

For example, when the user of the master terminal device 200 selects the user of the slave terminal device 300 from the user list, which is displayed on the input and output device 210 by the application program 250 being executed, by a touch operation, step S101 is executed.

In step S101, the acquirer 241 requests the slave terminal device 300 to execute an inquiry. This inquiry is an inquiry as to whether the QoS control service is available at a level higher than or equal to a level X.

The level X indicates the recommended quality (the quality that is recommended when the QoS control service is used in a situation in which the online competitive game is played).

The level X (the recommended quality) is input to the master terminal device 200 by the user of the master terminal device 200. For example, the user of the master terminal device 200 visually recognizes the level X based on an instruction about the online competition game displayed on the input and output device 210, and then inputs the level X to the master terminal device 200.

The level X may be set in advance as the content of the inquiry. In a case in which the online competition game includes a plurality of modes, the level X may be set in advance for each mode of the online competition game. In this case, without the user of the master terminal device 200 inputting the level X to the master terminal device 200, the level X is set to the inquiry.

Step S102: Inquiry from Slave Terminal Device 300

Based on receiving the request to execute the inquiry (inquiry request), the slave terminal device 300 executes an inquiry to the quality control apparatus 100 in step S102. The inquiry in step S102 is an inquiry as to whether the slave terminal device 300 is capable of receiving the QoS control service at a level higher than or equal to the level X.

The slave terminal device 300 may transmit position information on the slave terminal device 300 or contract information on the slave terminal device 300 to the quality control apparatus 100 at the time of the inquiry. The slave terminal device 300 may transmit both the position information on the slave terminal device 300 and the contract information on the slave terminal device 300 to the quality control apparatus 100 at the time of the inquiry.

The position information on the slave terminal device 300 indicates a position of the slave terminal device 300. The position information on the slave terminal device 300 is generated by a global positioning system (GPS), for example. The contract information on the slave terminal device 300 indicates a quality of the QoS control service available to the slave terminal device 300. The contract information on the slave terminal device 300 is registered in advance in the slave terminal device 300.

Step S103: Individual Determination to be Executed by Quality Control Apparatus 100

Based on receiving the inquiry from the slave terminal device 300, the quality control apparatus 100 determines in step S103 whether the slave terminal device 300 is capable of using the QoS control service at a level higher than or equal to the level X.

In step S103, the quality control apparatus 100 may determine, based on both the information received from the slave terminal device 300 and a situation of the QoS control in the network NW, whether the slave terminal device 300 is capable of using the QoS control service at a level higher than or equal to the level X.

It is assumed that the information received from the slave terminal device 300 includes the inquiry, the position information on the slave terminal device 300, and the contract information on the slave terminal device 300. The quality control apparatus 100 specifies, based on the position information on the slave terminal device 300, a communication area in which the slave terminal device 300 is present. The quality control apparatus 100 determines a quality level based on both a degree of communication congestion in the communication area in which the slave terminal device 300 is present and the contract information on the slave terminal device 300. The quality level is the lowest level from among the quality levels of the QoS control service available to the slave terminal device 300.

The quality control apparatus 100 reduces the quality level with an increase in the degree of communication congestion in the communication area, in which the slave terminal device 300 is positioned, for example. When the contract information on the slave terminal device 300 indicates an upper limit level of the quality of the QoS control service available to the slave terminal device 300, the quality control apparatus 100 sets the quality level to a level less than or equal to the upper limit level, for example.

When the quality level is a level greater than or equal to the level X, the quality control apparatus 100 determines that the slave terminal device 300 is capable of using the QoS control service at a level greater than or equal to the level X. When the quality level is lower than the level X, the quality control apparatus 100 determines that the slave terminal device 300 is not capable of using the QoS control service at a level greater than or equal to the level X.

Step S104: Response to Slave Terminal Device 300

Subsequently, in step S104, the quality control apparatus 100 notifies the slave terminal device 300 of a result of the determination for the slave terminal device 300 as a response to the inquiry. The result of the determination for the slave terminal device 300 is an example of the corresponding piece of quality information on the slave terminal device 300.

The result of the determination made by the quality control apparatus 100 is indicated only by simple binary information representative of "OK" or alternatively "NG".

The "OK" means that a terminal device, which is a determined target, (for example, the slave terminal device 300) is capable of using the QoS control service at a level greater than or equal to the level X.

The "NG" means that the terminal device, which is a determined target, is not capable of using the QoS control service at a level greater than or equal to the level X.

The result of the determination made by the quality control apparatus 100 may be indicated by both the binary information and a specific level at which the QoS control service is available (that is, a quality level determined by the quality control apparatus 100). The quality level is, for example, one of the level X, a level Y (where Y>X), and a level Z (where X>Z).

Step S105: Response to Master Terminal Device 200 (Notification of Response)

Based on receiving the result of the determination for the slave terminal device 300, the slave terminal device 300 notifies, in step S105, the acquirer 241 in the master terminal device 200 of the result of the determination as a response to the inquiry request.

Step S106: Receipt Executed by Master Terminal Device 200

In step S106, the acquirer 241 receives the result of the determination for the slave terminal device 300.

Step S107: Inquiry from Master Terminal Device 200

Subsequently, in step S107, the acquirer 241 executes an inquiry to the quality control apparatus 100. The inquiry in step S107 is an inquiry as to whether the master terminal device 200 is capable of receiving the QoS control service at a level higher than or equal to the level X.

The master terminal device 200 may transmit position information on the master terminal device 200 or contract information on the master terminal device 200 to the quality control apparatus 100 at the time of the inquiry. The master terminal device 200 may transmit both the position information on the master terminal device 200 and the contract information on the master terminal device 200 to the quality control apparatus 100 at the time of the inquiry. The position information on the master terminal device 200 indicates a position of the master terminal device 200. The position information on the master terminal device 200 is generated by a GPS, for example. The contract information on the master terminal device 200 indicates a quality of the QoS control service available to the master terminal device 200. The contract information on the master terminal device 200 is registered in advance in the master terminal device 200.

Step S108: Individual Determination to be Executed by Quality Control Apparatus 100

Based on receiving the inquiry from the master terminal device 200, the quality control apparatus 100 determines in step S108 whether the master terminal device 200 is capable of using the QoS control service at a level higher than or equal to the level X. The determination method in step S108 is similar to the determination method in step S103.

Step S109: Response to Master Terminal Device 200

Subsequently, in step S109, the quality control apparatus 100 notifies the acquirer 241 of a result of the determination for the master terminal device 200 as a response to the inquiry. The result of the determination for the master terminal device 200 is an example of the corresponding piece of quality information on the master terminal device 200.

Step S110: Receipt Executed by Master Terminal Device 200

Subsequently, in step S110, the acquirer 241 receives the result of the determination for the master terminal device 200.

Steps S107 to S110 may be executed before step S101.

Step S111: Group Determination Executed by Master Terminal Device 200

Subsequently, in step S111, the determiner 242 executes a group determination based on both the result of the determination for the master terminal device 200 and the result of the determination for the slave terminal device 300.

The group determination is a determination as to whether the first group G1 (the group including the master terminal device 200 and the slave terminal device 300) includes the second group G2 (the group satisfying the predetermined condition). To satisfy the predetermined condition means to satisfy all conditions included in the predetermined condition.

The predetermined condition used in the group determination is one of the following first to fourth conditions, for example. The predetermined condition is not limited to one of the first to fourth conditions.

Here, the number of terminal devices in the first group C1 is referred to as "N."

An integer, which is greater than or equal to 2 and which is less than or equal to N, is referred to as "M."

An integer, which is greater than or equal to 0 and which is less than or equal to M, is referred to as "R."

A level, which is less than the level X (the recommended quality) by the predetermined level, is referred to as a "level W."

(1) First Condition

The first condition can be used in a binary determination situation. The binary determination situation is a situation in which the result of the determination made by the quality control apparatus 100 is indicated only by the binary information (the information indicative of "OK" or alternatively "NG").

The first condition may be used in a combined determination situation. The combined determination situation is a situation in which the result of the determination made by the quality control apparatus 100 is indicated by the specific level (the quality level determined by the quality control apparatus 100) in addition to the binary information.

The first condition is constituted by a numerical condition, a first quality condition, and a master condition.

The numerical condition is a condition in which the number of terminal devices in the second group G2 is greater than or equal to M. As described above, M is an integer that is greater than or equal to 2 and that is less than or equal to N (the number of terminal devices in the first group G1).

For example, when N (the number of terminal devices in the first group G1) is used as M, the numerical condition means a condition in which the number of terminal devices in the second group G2 is greater than or equal to N (the number of terminal devices in the first group G1). Since the second group G2 belongs to the first group G1, an upper limit value of the number of terminal devices in the second group G2 is N (the number of terminal devices in the first group G1).

Therefore, when N is used as M, the numerical condition in which the number of terminal devices in the second group G2 is greater than or equal to N means a condition in which the number of terminal devices in the second group G2 is equal to the number of terminal devices in the first group G1.

The first quality condition is a condition in which the result of the determination made by the quality control apparatus 100 for each terminal device in the second group G2 is "OK"; in other words, a condition in which each terminal device in the second group G2 is capable of receiving the QoS control service at a quality higher than or equal to the level X. The first quality condition is an example of the quality condition. In the first quality condition, the level X is an example of the predetermined quality.

The master condition is a condition in which the master terminal device 200 belongs to the second group G2.

(2) Second Condition

The second condition can be used in the binary determination situation (the situation in which the result of the determination made by the quality control apparatus 100 is indicated only by the binary information indicative of "OK" or alternatively "NG").

The second condition may be used in the combined determination situation (the situation in which the result of the determination made by the quality control apparatus 100 is indicated by the quality level determined by the quality control apparatus 100 in addition to the binary information).

The second condition is constituted by the numerical condition and the first quality condition.

(3) Third Condition

The third condition can be used in the combined determination situation (the situation in which the result of the determination made by the quality control apparatus 100 is indicated by the quality level determined by the quality control apparatus 100 in addition to the binary information).

The third condition is constituted by the numerical condition, the master condition, a second quality condition, and an additional condition.

The second quality condition is a condition in which each terminal device in the second group G2 is capable of receiving the QoS control service at a quality higher than or equal to the level W (where level W<level X). The second quality condition is an example of the quality condition. In the second quality condition, the level W is an example of the predetermined quality.

The additional condition is a condition in which the result of the determination made by the quality control apparatus 100 for each of R or more terminal devices in the second group G2 is "OK," R being an integer that is greater than or equal to 0 and that is less than or equal to M. M is an integer that is greater than or equal to 2 and that is less than or equal to N (the number of terminal devices in the first group G1). Therefore, the additional condition means a condition in which the R or more terminal devices belonging to the second group G2 is capable of receiving the QoS control service at a quality higher than or equal to the level X.

(4) Fourth Condition

The fourth condition can be used in the combined determination situation (the situation in which the result of the determination made by the quality control apparatus 100 is indicated by the quality level determined by the quality control apparatus 100 in addition to the binary information).

The fourth condition is constituted by the numerical condition, the second quality condition, and the additional condition.

In the group determination, the determiner 242 further determines that a terminal device, which does not belong to the second group G2, among the plurality of terminal devices belonging to the first group G1, is not capable of participating in the online competition game service.

The determiner 242 may display a result of the group determination on the input and output device 210. In this case, the user of the master terminal device 200 can visually recognize the result of the group determination.

Step S112: Notification of Result of Determination to Slave Terminal Device 300

Subsequently, in step S112, the situation controller 243 executes an operation based on the result of the determination made by the determiner 242.

For example, based on the result of the determination made by the determiner 242 being affirmative, the situation controller 243 urges the second group G2 (the group satisfying the predetermined condition) to receive the QoS control service at a quality higher than or equal to the predetermined quality. A fact that the result of the determination made by the determiner 242 is affirmative means that the first group G1 includes the second group G2 (the group satisfying the predetermined condition).

In step S112, the situation controller 243 first generates a piece of notification information based on the result of the determination made by the determiner 242 for each terminal device belonging to the first group G1. The pieces of notification information correspond one-to-one with the terminal devices belonging to the first group G1.

Subsequently, the situation controller 243 transmits the piece of notification information to a terminal device (the slave terminal device 300), which is different from a terminal device (the master terminal device 200) including the situation controller 243 among the terminal devices belonging to the first group G1, via the communication device 220.

The piece of notification information includes at least first to fourth notification information.

The first notification information indicates whether the first group G1 includes the two or more terminal devices (the second group G2) capable of receiving the QoS control service at a quality higher than or equal to the predetermined quality.

The second notification information indicates whether a terminal device, which corresponds to the piece of notification information including the second notification information, is capable of receiving the QoS control service at a quality higher than or equal to the predetermined quality.

The third notification information indicates a level of the quality of the QoS control service to be received by a terminal device, which corresponds to the piece of notification information including the third notification information, when the terminal device corresponding to the piece of notification information including the third notification information is capable of receiving the QoS control service at a quality higher than or equal to the predetermined quality.

For example, when the level of the QoS control service to be received by each of the terminal devices belonging to the second group G2 is to be set to the same level, the third notification information indicates the same level.

When the setting of the level of the QoS control service to be received by the terminal device belonging to the second group G2 is entrusted to the terminal device, the third notification information indicates that the setting of the level of the QoS control service is entrusted to the terminal device.

The third notification information may indicate a level of the QoS control service to be received by a terminal device not only for the terminal device corresponding to the piece of notification information including the third notification information, but also for each of all the terminal devices belonging to the second group G2.

The fourth notification information indicates an identifier of the second group G2.

The situation controller 243 may change the contents of the piece of notification information in accordance with both the contents of the result of the determination made by the quality control apparatus 100 and the contents of the predetermined condition. For example, the situation controller 243 may change the contents of the piece of notification information in accordance with the following first to sixth patterns.

(1) First Pattern

The first pattern is a pattern in which the first condition is used in the binary determination situation (the situation in which the result of the determination made by the quality control apparatus 100 is indicated only by the binary information indicative of "OK" or alternatively "NG"). As described above, the first condition is constituted by the numerical condition, the first quality condition, and the master condition.

In the first pattern, the situation controller 243 uses a piece of information, which includes the first to fourth notification information, as the piece of notification information. In the first pattern, when the level of the QoS control service to be received by each of the terminal devices belonging to the second group G2 is to be set to the same level, the third notification information indicates the level X as the same level.

(2) Second Pattern

The second pattern is a pattern in which the second condition is used in the binary determination situation (the situation in which the result of the determination made by the quality control apparatus 100 is indicated only by the binary information indicative of "OK" or alternatively "NG"). As described above, the second condition is constituted by the numerical condition and the first quality condition.

In the second pattern, the situation controller 243 uses a piece of information, which includes the first to fourth notification information and fifth notification information, as the piece of notification information. In the second pattern, there is no master condition. Therefore, when the first group G1 includes a plurality of slave terminal devices 300, the second group G2 may not include the master terminal device 200. The fifth notification information indicates a successor to the master when the second group G2 does not include the master terminal device 200.

The situation controller 243 randomly selects the successor to the master from among the terminal devices included in the second group G2, for example. The method for selecting the successor to the master is not limited to the method described above. For example, the successor to the master may be a terminal device that is first selected as a terminal device belonging to the second group G2.

In the second pattern, when the level of the QoS control service to be received by each of the terminal devices belonging to the second group G2 is to be set to the same level, the third notification information indicates the level X as the same level.

(3) Third Pattern

The third pattern is a pattern in which the first condition is used in the combined determination situation (the situation in which the result of the determination made by the quality control apparatus 100 is indicated by the quality level determined by the quality control apparatus 100 in addition to the binary information). The first condition is constituted by the numerical condition, the first quality condition, and the master condition.

In the third pattern, the situation controller 243 uses a piece of information, which includes the first to fourth notification information, as the piece of notification information. In the third pattern, when the level of the QoS control service to be received by each of the terminal devices belonging to the second group G2 is to be set to the same level, the third notification information indicates the level X or a specific level as the same level. The specific level is the lowest level from among levels of the QoS control service available to the respective two or more terminal devices belonging to the second group G2. The specific level is an example of the specific quality.

(4) Fourth Pattern

The fourth pattern is a pattern in which the second condition is used in the combined determination situation (the situation in which the result of the determination made by the quality control apparatus 100 is indicated by the quality level determined by the quality control apparatus 100 in addition to the binary information). The second condition is constituted by the numerical condition and the first quality condition.

In the fourth pattern, the situation controller 243 uses a piece of information, which includes the first to fifth notification information, as the piece of notification information. In the fourth pattern, since there is no master condition, the second group G2 may not include the master terminal device 200. Therefore, the fifth notification information is used.

In the fourth pattern, when the level of the QoS control service to be received by each of the terminal devices belonging to the second group G2 is to be set to the same level, the third notification information indicates the level X or the specific level as the same level. As described above, the specific level is the lowest level from among levels of the QoS control service available to the respective two or more terminal devices belonging to the second group G2.

(5) Fifth Pattern

The fifth pattern is a pattern in which the third condition is used in the combined determination situation (the situation in which the result of the determination made by the quality control apparatus 100 is indicated by the quality level determined by the quality control apparatus 100 in addition to the binary information). The third condition is constituted by the numerical condition, the master condition, the second quality condition, and the additional condition.

In the fifth pattern, the situation controller 243 uses the piece of information, which includes the first to fourth notification information as the piece of notification information.

In the fifth pattern, the first notification information indicates whether two or more terminal devices belonging to the first group G1 are capable of receiving the QoS control service at a quality higher than or equal to the level W. In the fifth pattern, the first notification information further indicates a terminal device, for which a quality level is a level higher than or equal to the level W and lower than the level X, from among the terminal devices belonging to the second group G2.

In the fifth pattern, when the level of the QoS control service to be received by each of the terminal devices belonging to the second group G2 is to be set to the same level, the third notification information indicates the level W or the specific level as the same level. As described above, the specific level is the lowest level from among levels of the QoS control service available to the respective two or more terminal devices belonging to the second group G2.

(6) Sixth Pattern

The sixth pattern is a pattern in which the fourth condition is used in the combined determination situation (the situation in which the result of the determination made by the quality control apparatus 100 is indicated by the quality level determined by the quality control apparatus 100 in addition to the binary information). The fourth condition is constituted by the numerical condition, the second quality condition, and the additional condition.

In the sixth pattern, the situation controller 243 uses the piece of information, which includes the first to fifth notification information, as the piece of notification information. In the sixth pattern, since there is no master condition, the second group G2 may not include the master terminal device 200. Therefore, the fifth notification information is used. The first to fourth notification information used in the sixth pattern is the same as the first to fourth notification information used in the fifth pattern, respectively.

The terminal devices belonging to the second group G2 are urged by the piece of notification information or, more specifically, by the situation controller 243 to receive the QoS control service at a quality higher than or equal to the predetermined quality (for example, the level X, the level W, or the specific level).

Furthermore, the terminal devices belonging to the second group G2 are urged to receive the online competition game service by the piece of notification information or, more specifically, by the situation controller 243.

Step S113: Request of QoS Control Service from Slave Terminal Device 300

In response to receiving the piece of notification information, based on the second notification information included in the piece of notification information, the slave terminal device 300 confirms whether the slave terminal device 300 is capable of receiving the QoS control service at a quality higher than or equal to the predetermined quality.

Based on the second notification information indicating that the slave terminal device 300 is capable of receiving the QoS control service at a quality higher than or equal to the predetermined quality, the slave terminal device 300 executes step S113.

In step S113, the slave terminal device 300 requests the quality control apparatus 100 to receive the QoS control service at the level indicated by the third notification information included in the piece of notification information.

The slave terminal device 300 may display the contents indicated by the piece of notification information. In this case, by visually confirming the contents indicated by the piece of notification information (the contents indicated by the first notification information), the user of the slave terminal device 300 can determine whether two or more terminal devices belonging to the first group G1 are capable of receiving the QoS control service at a quality higher than or equal to the predetermined quality.

The situation controller 243 in the master terminal device 200 may request the quality control apparatus 100 to provide the slave terminal device 300 with the QoS control service at the level indicated by the third notification information corresponding to the slave terminal device 300. In this case, steps S112 and S113 are omitted.

Step S114: QoS Control Service for Slave Terminal Device 300

In step S114, based on the request described above, the quality control apparatus 100 provides the slave terminal device 300 with the QoS control services at the requested level.

Step S115: Request of QoS Control Service from Master Terminal Device 200

Subsequently, the situation controller 243 specifies the second notification information from the piece of notification information corresponding to the master terminal device 200. Subsequently, the situation controller 243 confirms, based on the second notification information, whether the master terminal device 200 is capable of receiving the QoS control service at a quality higher than or equal to the predetermined quality.

Based on the second notification information indicating that the master terminal device 200 is capable of receiving the QoS control service at a quality higher than or equal to the predetermined quality, the situation controller 243 executes step S115.

In step S115, the situation controller 243 first specifies the third notification information from the piece of notification information corresponding to the master terminal device 200. Subsequently, the situation controller 243 requests the quality control apparatus 100 to receive the QoS control service at the level indicated by the third notification information.

Step S116: QoS Control Service for Master Terminal Device 200

In step S116, based on the request, the quality control apparatus 100 provides the master terminal device 200 with the QoS control service at the requested level.

Steps S115 to S116 may be executed during a period between step S111 and step S112.

Thereafter, the operation controller 244 executes P2P communication with the slave terminal device 300 via the network NW to provide the user of the master terminal device 200 with the online competition game service in which the user of the slave terminal device 300 is an opponent.

The operation controller 244 confirms whether both the fourth notification information corresponding to the master terminal device 200 and the fourth notification information corresponding to the slave terminal device 300 indicate the same identifier (the identifier of the second group G2).

Based on the same identifier (the identifier of the second group G2) being indicated, the operation controller 244 provides the user of the master terminal device 200 with the online competition game service in which the user of the slave terminal device 300 is an opponent.

A6: Summary of First Embodiment

According to the first embodiment, in a situation in which both the user of the master terminal device 200 and the user of the slave terminal device 300 have agreed to play the online competition game, it is possible for each terminal device to receive a communication service at a quality higher than or equal to the predetermined quality.

B: Modifications

The following are examples of modifications of the embodiment described above. Two or more modifications freely selected from the following modifications may be combined as long as no conflict arises from such combination.

B1: First Modification

B11: Configuration of First Modification

Figure 3:
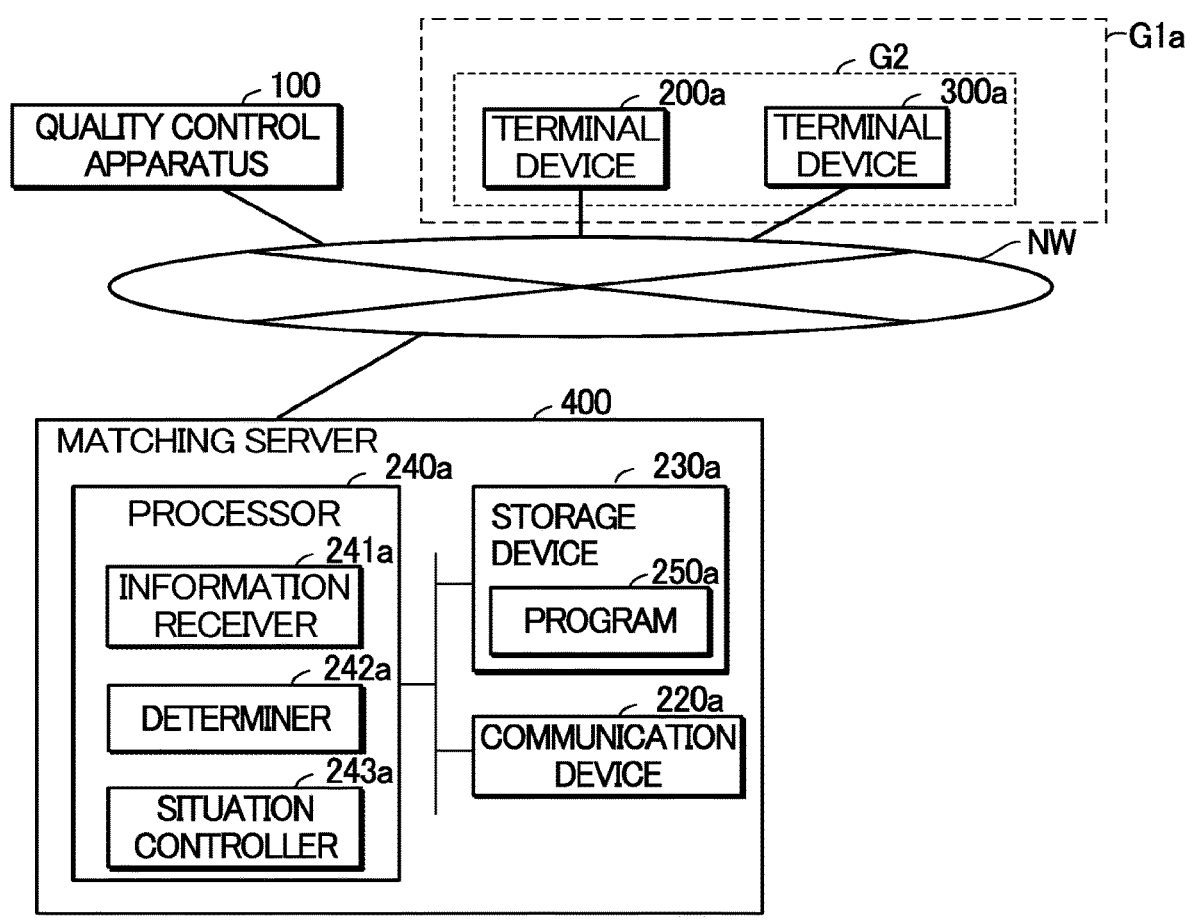
FIG. 3 is a diagram showing a first modification.

FIG. 3 is a diagram showing a first modification. Main differences between the first modification and the first embodiment are as follows. The first modification includes a matching server 400. In the first modification, a terminal device 200a is used instead of the master terminal device 200. In the first modification, a terminal device 300a is used instead of the slave terminal device 300.

The matching server 400 is configured to determine players, who are to compete against each other in the online competition game, from among people who desire to play the online competition game. The people who desire to play the online competition game include, for example, a user of the terminal device 200a and a user of the terminal device 300a.

The matching server 400 provides the online competition game service for terminal devices used by players. The online competitive game service may be provided by a game server different from the matching server 400.

The terminal device 200a and the terminal device 300a belong to a first group G1a. The number of terminal devices belonging to the first group G1a is not limited to 2, and the number of terminal devices belonging to the first group G1a may be 3 or more. The terminal device 200a and the terminal device 300a are examples of a plurality of terminal devices.

Each of the terminal device 200a and the terminal device 300a is a portable information processing device or a stationary information processing device. The terminal device 200a and the terminal device 300a each include elements similar to those of the master terminal device 200 described above. The terminal device 200a and the terminal device 300a each store a game application program. The terminal device 200a and the terminal device 300a each execute the game application program to receive the online competition game service from the matching server 400. The terminal device 200a and the terminal device 300a are each capable of receiving the QoS control service from the quality control apparatus 100.

The terminal device 200a inquires of the quality control apparatus 100 whether the QoS control service is available at a level higher than or equal to the level X. As described above, the level X indicates the quality that is recommended when the QoS control service is used in a situation in which the online competitive game is played. The terminal device 200a receives a response to the inquiry from the quality control apparatus 100. The response is a corresponding piece of quality information for the terminal device 200a (a result of a determination for the terminal device 200a made by the quality control apparatus 100).

The terminal device 300a inquires of the quality control apparatus 100 whether the QoS control service is available at a level higher than or equal to the level X. The terminal device 300a receives a response to the inquiry from the quality control apparatus 100. The response is a corresponding piece of quality information for the terminal device 300a (a result of a determination for the terminal device 300a made by the quality control apparatus 100).

The matching server 400 includes a communication device 220a, a storage device 230a, and a processor 240a. Elements of the matching server 400 are interconnected via one or more buses. Each element of the matching server 400 is constituted by one or more devices. One or some of the elements of the matching server 400 may be omitted.

The communication device 220a communicates with the quality control apparatus 100, the terminal device 200a, and the terminal device 300a via the network NW.

The storage device 230a is a recording medium readable by the processor 240a. The storage device 230a includes, for example, a nonvolatile memory and a volatile memory. The storage device 230a stores a program 250a.

The processor 240a is an example of the management apparatus. The processor 240a includes, for example, one or more processors. For example, the processor 240a includes one or more CPUs. One, some, or all of the functions of the processor 240a may be implemented by a circuit such as a DSP, an ASIC, a PLD, an FPGA, etc.

The processor 240a reads the program 250a from the storage device 230a. The processor 240a executes the program 250a to realize an information receiver 241a, a determiner 242a, and a situation controller 243a.

The information receiver 241a receives a game service request from the terminal device 200a. The game service request, which is received from the terminal device 200a, includes the corresponding piece of quality information for the terminal device 200a (the result of the determination for the terminal device 200a made by the quality control apparatus 100).

The information receiver 241a receives a game service request from the terminal device 300a. The game service request, which is received from the terminal device 300a, includes the corresponding piece of quality information for the terminal device 300a (the result of the determination for the terminal device 300a made by the quality control apparatus 100).

The information receiver 241a may be constituted by, for example, an information receiving circuit. The information receiver 241a is an example of the receiver.

The determiner 242a determines, based on both the corresponding piece of quality information for the terminal device 200a and the corresponding piece of quality information for the terminal device 300a, whether the first group G1a includes the second group G2 (the group satisfying the predetermined condition). The determiner 242a may be constituted by a determination circuit.

Based on a result of a determination made by the determiner 242a being affirmative, the situation controller 243a causes a first situation in which the terminal devices belonging to the second group G2 receive the QoS control service at a quality higher than or equal to the predetermined quality. A fact that the result of the determination made by the determiner 242a is affirmative means that the first group G1a includes the second group G2 (the group satisfying the predetermined condition).

For example, based on the result of the determination made by the determiner 242a being affirmative, the situation controller 243a causes the first situation by urging the terminal devices of the second group G2 to receive the QoS control service at a quality higher than or equal to the predetermined quality.

Based on the result of the determination made by the determiner 242a being affirmative, the situation controller 243a may cause the first situation by urging the quality control apparatus 100 to provide the terminal devices of the second group G2 with the QoS control service at a quality higher than or equal to the predetermined quality.

Based on the result of the determination made by the determiner 242a being affirmative, the situation controller 243a may permit provision of the online competition game service to the terminal devices in the second group G2.

The situation controller 243a may be constituted by a situation control circuit.

B12: Operation of First Modification

Figure 4:
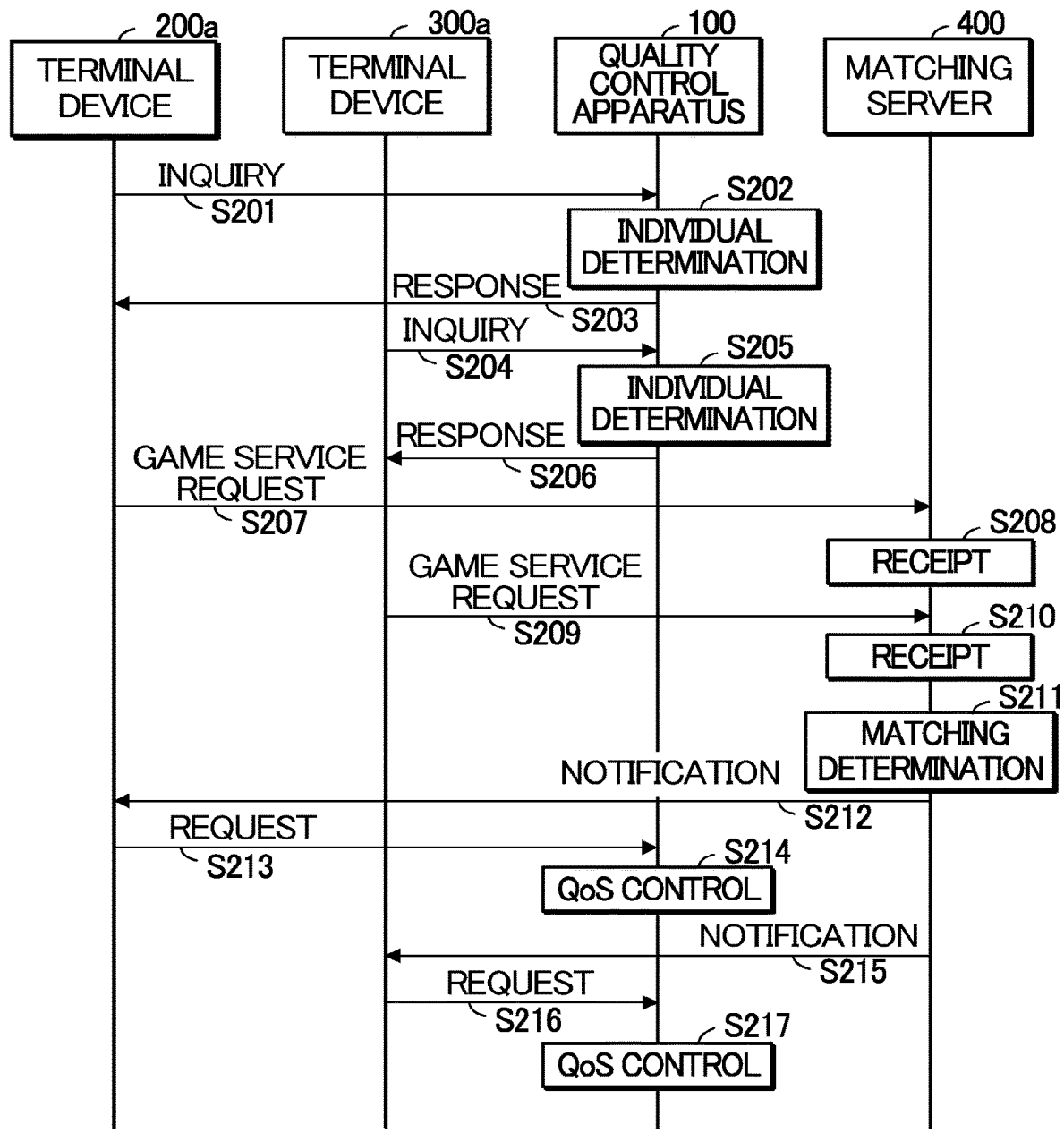
FIG. 4 is a sequence diagram showing an operation of the first modification.

FIG. 4 is a sequence diagram showing an operation of the first modification.
Step S201: Inquiry from Terminal Device 200a
The terminal device 200a executes step S201, for example, based on executing a game application program in response to a user operation. In step S201, the terminal device 200a inquires of the quality control apparatus 100 whether the QoS control service is available at a level greater than or equal to the level X (the recommended quality).
Step S202: Individual Determination to be Executed by Quality Control Apparatus 100
Based on receiving the inquiry from the terminal device 200a, the quality control apparatus 100 executes a determination (individual determination) for the terminal device 200a in step S202. The determination method in step S202 is similar to the determination method in step S103.
Step S203: Response to Terminal Device 200a
Subsequently, in step S203, the quality control apparatus 100 notifies the terminal device 200a of the result of the determination for the terminal device 200a as a response to the inquiry. This result of the determination is an example of the corresponding piece of quality information on the terminal device 200a.
Step S204: Inquiries from Terminal Device 300a
The terminal device 300a executes step S204, for example, based on executing a game application program in response to a user operation. In step S204, the terminal device 300a inquires of the quality control apparatus 100 whether the QoS control service is available at a level greater than or equal to the level X (the recommended quality).
Step S205: Individual Determination to be Executed by Quality Control Apparatus 100
Based on receiving the inquiry from the terminal device 300a, the quality control apparatus 100 executes a determination (individual determination) for the terminal device 300a in step S205. The determination method in step S205 is similar to the determination method in step S202.
Step S206: Response to Terminal Device 300a
Subsequently, in step S206, the quality control apparatus 100 notifies the terminal device 300a of the result of the determination for the terminal device 300a as a response to the inquiry. This result of the determination is an example of the corresponding piece of quality information on the terminal device 300a.

Steps S204 to S206 may be executed prior to the execution of step S201.
Step S207: Game Service Request from Terminal Device 200a
Subsequently, in step S207, the terminal device 200a transmits a game service request to the matching server 400. This game service request includes the result of the determination for the terminal device 200a. The terminal device 200a transmits the game service request to the matching server 400 regardless of the result of the determination for the terminal device 200a. When the result of the determination for the terminal device 200a indicates "NG," the terminal device 200a may not transmit the game service request to the matching server 400.
Step S208: Receipt Executed by Matching Server 400
In step S208, the information receiver 241a in the matching server 400 receives the game service request from the terminal device 200a.
Step S209: Game Service Request from Terminal Device 300a
Subsequently, in step S209, the terminal device 300a transmits a game service request to the matching server 400. This game service request includes the result of the determination for the terminal device 300a. The terminal device 300a transmits the game service request to the matching server 400 regardless of the result of the determination for the terminal device 300a. When the result of the determination for the terminal device 300a indicates "NG," the terminal device 300a may not transmit the game service request to the matching server 400.

Step S210: Receipt Executed by Matching Server 400

In step S210, the information receiver 241a in the matching server 400 receives the game service request from the terminal device 300a.

Steps S209 and S210 may be performed during a period between steps S206 and S207.

Step S211: Matching Determination

Subsequently, the matching determination is executed in step S211. In step S211, the determiner 242a first obtains the result of the determination for the terminal device 200a from the game service request received from the terminal device 200a. Subsequently, the determiner 242a obtains the result of the determination for the terminal device 300a from the game service request received from the terminal device 300a. Subsequently, the determiner 242a determines, based on both the result of the determination for the terminal device 200a and the result of the determination for the terminal device 300a, whether the first group G1a includes the second group G2 (the group satisfying the predetermined condition)

The determiner 242a uses, as the predetermined condition, the second condition (the condition constituted by the numerical condition and the first quality condition) or the fourth condition (the condition constituted by the numerical condition, the second quality condition, and the additional condition) among the first to fourth conditions described above. Since the first condition and the third condition include the master conditions that are not necessary in the first modification, the determiner 242a does not use the first condition or the third condition as the predetermined condition.

The numerical condition is a condition in which the number of terminal devices in the second group G2 is greater than or equal to M. Here, M is an integer that is greater than or equal to 2 and that is less than or equal to N (the number of terminal devices in the first group G1).

The first quality condition is a condition in which the result of the determination made by the quality control apparatus 100 for each terminal device in the second group G2 is "OK." In other words, the first quality condition is a condition in which each terminal device in the second group G2 is capable of receiving the QoS control service at a quality higher than or equal to the level X (the recommended quality).

The second quality condition is a condition in which each terminal device in the second group G2 is capable of receiving the QoS control service at a quality higher than or equal to the level W (where level W<level X).

The additional condition is a condition in which the result of the determination made by the quality control apparatus 100 for each of R or more terminal devices in the second group G2 is "OK," R being an integer that is greater than or equal to 0 and that is less than or equal to M. M is an integer that is greater than or equal to 2 and that is less than or equal to N (the number of terminal devices in the first group G0. That is, the additional condition is a condition in which the R or more terminal devices belonging to the second group G2 is capable of receiving the QoS control service at a quality higher than or equal to the level X.

Subsequently, the situation controller 243a executes an operation based on the result of the determination made by the determiner 242a. For example, based on the result of the determination made by the determiner 242a being affirmative, the situation controller 243a determines the terminal devices in the second group G2 (the group satisfying the predetermined condition) as terminal devices used for mutual competition in the online competition game. This determination may be referred to as "matching." A fact that the result of the determination made by the determiner 242a is affirmative means that the first group G1a includes the second group G2 (the group satisfying the predetermined condition).

When the result of the determination made by the determiner 242a is negative because only the numerical condition in the predetermined condition is not satisfied, the situation controller 243a may add a bot to virtually satisfy the predetermined condition. In this case, the bot belongs to the second group G2. Even when the bot belongs to the second group G2, the situation controller 243a determines the terminal devices in the second group G2 as terminal devices used for mutual competition in the online competition game. The bot may be referred to as a virtual terminal device or a virtual user of a virtual terminal device.

Step S212: Notification of Result of Determination to Terminal Device 200a

The situation controller 243a generates a piece of notification information based on the result of the matching determination for each terminal device in the first group G1a. Therefore, the pieces of notification information correspond one-to-one with the terminal devices belonging to the first group G1a.

Subsequently, the situation controller 243 transmits the piece of notification information to the terminal device in the first group G1a via the communication device 220a. Step S212 is an operation in which the situation controller 243 transmits the piece of notification information corresponding to the terminal device 200a to the terminal device 200a.

The piece of notification information indicates the first to fourth notification information as described above.

The first notification information indicates whether two or more terminal devices in the first group G1a are capable of receiving the QoS control service at a quality higher than or equal to the predetermined quality.

The second notification information indicates whether a terminal device, which corresponds to the piece of notification information including the second notification information, is capable of receiving the QoS control service at a quality higher than or equal to the predetermined quality.

The third notification information indicates a level of the quality of the QoS control service to be received by a terminal device, which corresponds to the piece of notification information including the third notification information, when the terminal device corresponding to the piece of notification information including the third notification information is capable of receiving the QoS control service at a quality higher than or equal to the predetermined quality.

For example, when the level of the QoS control service to be received by each of the terminal devices belonging to the second group G2 is to be set to the same level, the third notification information indicates the same level. When the setting of the level of the QoS control service to be received by the terminal device belonging to the second group G2 is entrusted to the terminal device, the third notification information indicates that the setting of the level of the QoS control service is entrusted to the terminal device. The third notification information may indicate a level of the QoS control service to be received by a terminal device not only for the terminal device corresponding to the piece of notification information including the third notification information, but also for each of the terminal devices belonging to the second group G2.

The fourth notification information indicates the identifier of the second group G2.

The situation controller 243a may change the contents of the piece of notification information in accordance with both the contents of the result of the determination made by the quality control apparatus 100 and the contents of the predetermined condition. For example, the situation controller 243a may change the contents of the piece of notification information in accordance with the following patterns 1a to 3a.

(1) Pattern 1a

The pattern 1a is a pattern in which the second condition is used in the binary determination situation (the situation in which the result of the determination made by the quality control apparatus 100 is indicated only by the binary information indicative of "OK" or alternatively "NG"). As described above, the second condition is constituted by the numerical condition and the first quality condition.

In the pattern 1a, when the level of the QoS control service to be received by each of the terminal devices belonging to the second group G2 is to be set to the same level, the third notification information indicates the level X as the same level.

(2) Pattern 2a

The pattern 2a is a pattern in which the second condition is used in the combined determination situation (the situation in which the result of the determination made by the quality control apparatus 100 is indicated by the quality level determined by the quality control apparatus 100 in addition to the binary information). The second condition is constituted by the numerical condition and the first quality condition.

In the pattern 2a, when the level of the QoS control service to be received by each of the terminal devices belonging to the second group G2 is to be set to the same level, the third notification information indicates the level X or the specific level as the same level. The specific level is the lowest level from among levels of the QoS control service available to the respective two or more terminal devices belonging to the second group G2.

(3) Pattern 3a

The pattern 3a is a pattern in which the fourth condition is used in the combined determination situation (the situation in which the result of the determination made by the quality control apparatus 100 is indicated by the quality level determined by the quality control apparatus 100 in addition to the binary information). The fourth condition is constituted by the numerical condition, the second quality condition, and the additional condition.

In the pattern 3a, the first notification information indicates whether two or more terminal devices belonging to the first group G1a are capable of receiving the QoS control service at a quality higher than or equal to the level W. In the pattern 3a, the first notification information further indicates a terminal device, for which a quality level is a level higher than or equal to the level W and lower than the level X, from among the terminal devices belonging to the second group G2.

In the pattern 3a, when the level of the QoS control service to be received by each of the terminal devices belonging to the second group G2 is to be set to the same level, the third notification information indicates the level W or the specific level as the same level. As described above, the specific level is the lowest level from among levels of the QoS control service available to the respective two or more terminal devices belonging to the second group G2.

The terminal devices in the second group G2 are urged by the piece of notification information, in other words, by the situation controller 243a to receive the QoS control service at a quality higher than or equal to the predetermined quality (for example, the level X, the level W, or the specific level). The terminal devices in the second group G2 are urged by the piece of notification information, in other words, by the situation controller 243a to receive the online competition game service.

Step S213: Request of QoS Control Service from Terminal Device 200a

In response to receiving the piece of notification information, based on the second notification information included in the piece of notification information, the terminal device 200a confirms whether the terminal device 200a is capable of receiving the QoS control service at a quality higher than or equal to the predetermined quality.

Based on the second notification information indicating that the terminal device 200a is capable of receiving the QoS control service at a quality higher than or equal to the predetermined quality, the terminal device 200a executes step S213.

In step S213, the terminal device 200a requests the quality control apparatus 100 to receive the QoS control service at the level indicated by the third notification information included in the piece of notification information.

The terminal device 200a may display the contents indicated by the piece of notification information.

The situation controller 243a may request the quality control apparatus 100 to provide the terminal device 200a with the QoS control service at the level indicated by the third notification information corresponding to the terminal device 200a. In this case, steps S212 and S213 are omitted.

Step S214: QoS Control Service for Terminal Device 200a

In step S214, based on the request described above, the quality control apparatus 100 provides the terminal device 200a with the QoS control service at the requested level.

Step S215: Notification of Result of Determination to Terminal Device 300a

Step S215 is an operation in which the situation controller 243a transmits the piece of notification information corresponding to the terminal device 300a to the terminal device 300a.

Step S216: Request of QoS Control Service from Terminal Device 300a

In response to receiving the piece of notification information, based on the second notification information included in the piece of notification information, the terminal device 300a confirms whether the terminal device 300a is capable of receiving the QoS control service at a quality higher than or equal to the predetermined quality.

Based on the second notification information indicating that the terminal device 300a is capable of receiving the QoS control service at a quality higher than or equal to the predetermined quality, the terminal device 300a executes step S216.

In step S216, the terminal device 300a requests the quality control apparatus 100 to receive the QoS control service at the level indicated by the third notification information included in the piece of notification information.

The terminal device 300a may display the contents indicated by the piece of notification information.

The situation controller 243a may request the quality control apparatus 100 to provide the terminal device 300a with the QoS control service at the level indicated by the third notification information corresponding to the terminal device 300a. In this case, steps S215 and S216 are omitted.

Step S217: QoS Control Service for Terminal Device 300a

In step S217, based on the request described above, the quality control apparatus 100 provides the terminal device 300a with the QoS control service at the requested level.

Steps S215 to S217 may be executed during a period between step S211 and step S212.

Thereafter, the situation controller 243a permits provision of the online competition game service to the terminal device 200a and the terminal device 300a via the network NW.

The situation controller 243a confirms whether both the fourth notification information corresponding to the terminal device 200a and the fourth notification information corresponding to the terminal device 300a indicate the same identifier (the identifier of the second group G2).

Based on the same identifier (the identifier of the second group G2) being indicated, the situation controller 243a permits the provision of the online competition game service to the terminal device 200a and the terminal device 300a.

In response to permission to provide the online competition game service, the situation controller 243a or the game server provides the online competition game service for the terminal device 200a and the terminal device 300a.

B13: Summary of First Modification

According to the first modification, in a situation in which a match between the user of the terminal device 200a and the user of the terminal device 300a is determined in the online competition game, the matching server 400 enables each terminal device to receive a communication service at a quality higher than or equal to a predetermined quality.

B2: Second Modification

In the first modification, the user of the terminal device 200a and the user of the terminal device 300a have not previously agreed to play against each other in the online competition game. In the second modification, the user of the terminal device 200a and the user of the terminal device 300a have previously agreed to play against each other in the online competition game. The user of the terminal device 200a operates the terminal device 200a in accordance with the contents agreed to in advance.

B21: Configuration of Second Modification

Figure 5:
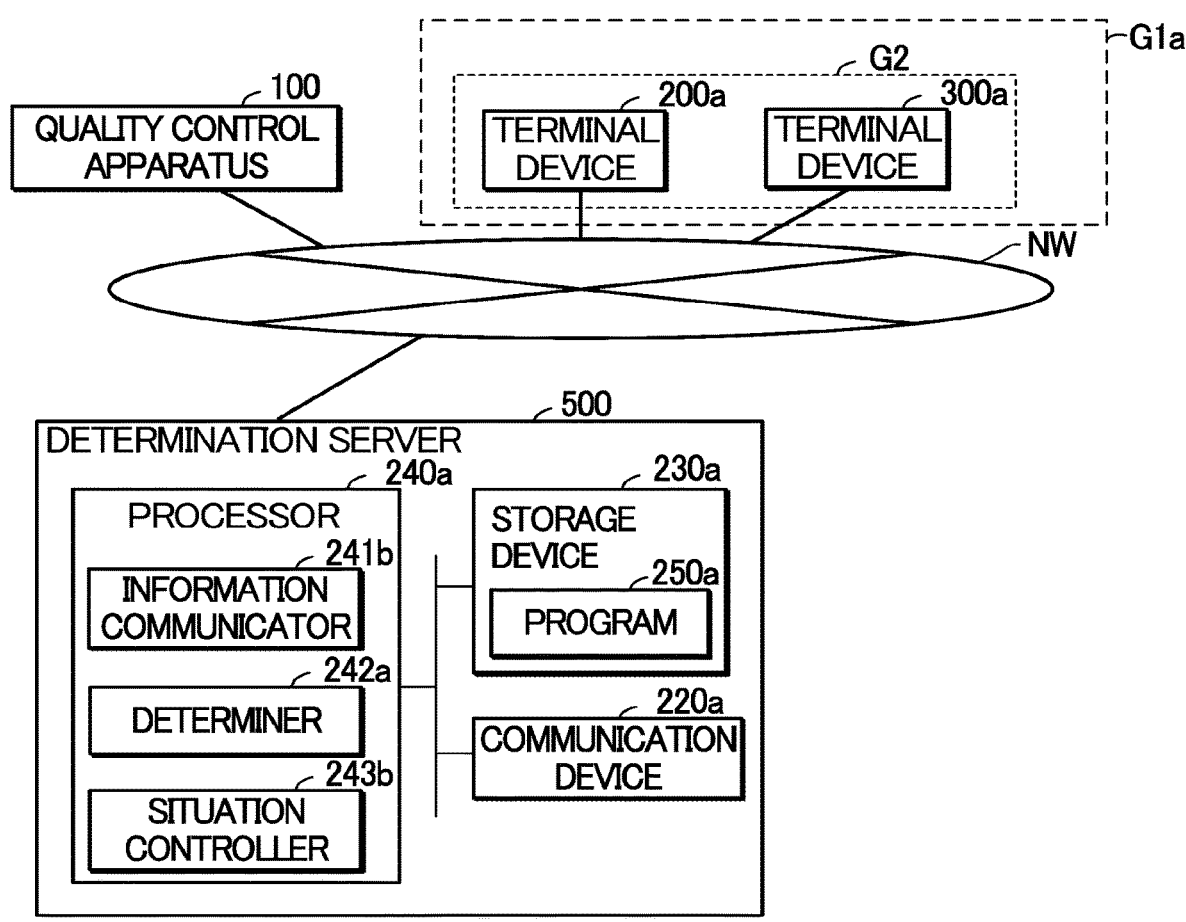
FIG. 5 is a diagram showing a second modification.

FIG. 5 is a diagram showing a second modification. The main differences between the second modification and the first modification are as follows. In the second modification, a determination server 500 is used instead of the matching server 400. The determination server 500 executes the group determination in place of the master terminal device 200 in the first embodiment.

The determination server 500 includes the communication device 220a, the storage device 230a, and the processor 240a. Elements of the determination server 500 are interconnected via one or more buses. Each element of the determination server 500 is constituted by one or more devices. One or some of the elements of the determination server 500 may be omitted.

The processor 240a reads the program 250a from the storage device 230a. The processor 240a executes the program 250a to realize an information communicator 241b, the determiner 242a, and a situation controller 243b. In the second modification, the processor 240a realizes the information communicator 241b instead of the information receiver 241a. In the second modification, the processor 240a realizes the situation controller 243b instead of the situation controller 243a. The information communicator 241b is an example of the receiver. The information communicator 241b may be constituted by an information communication circuit or a communication circuit. The situation controller 243b may be constituted by a situation control circuit.

B22: Operation of Second Modification

Figure 6:
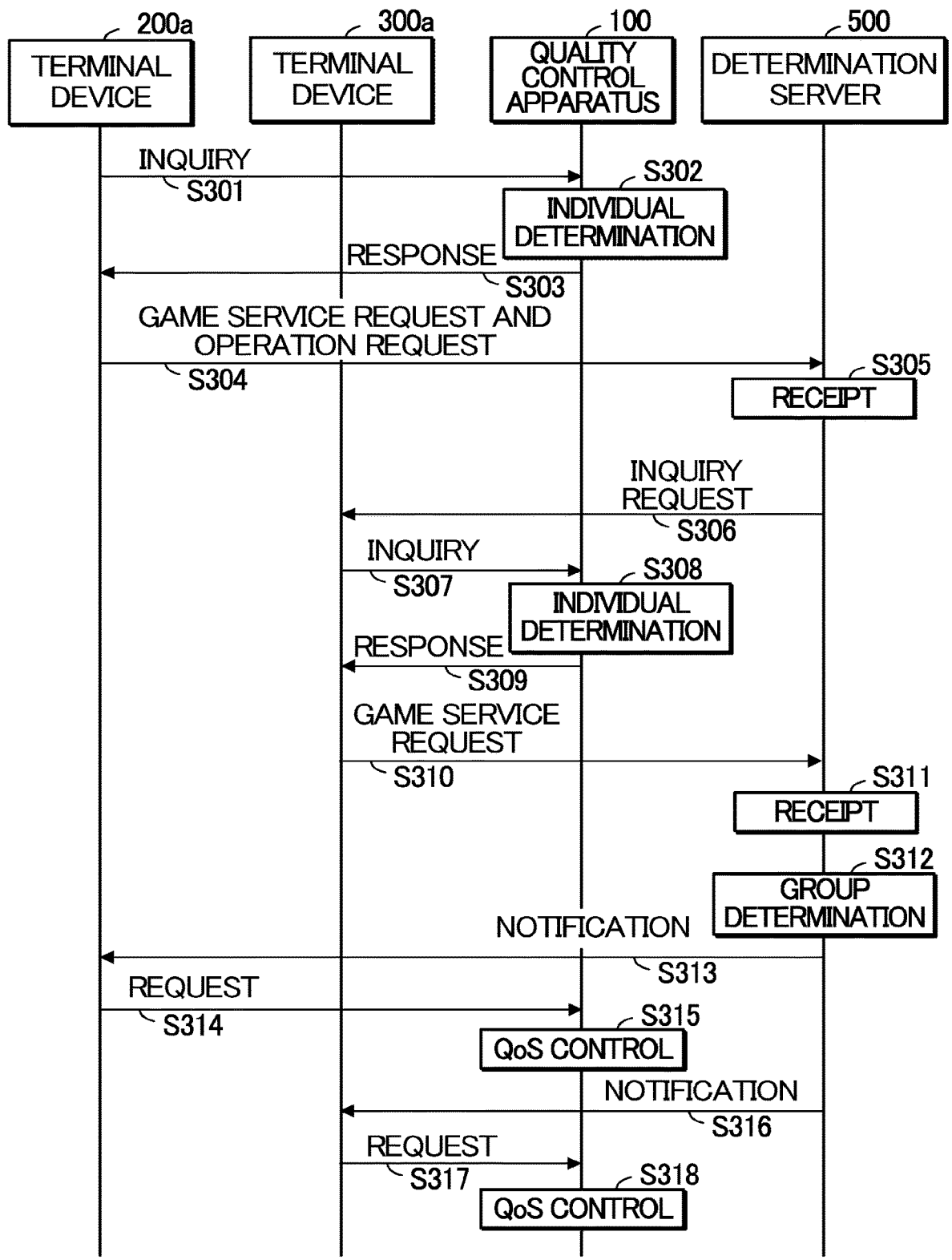
FIG. 6 is a sequence diagram showing an operation of the second modification.

FIG. 6 is a sequence diagram showing an operation of the second modification. First, steps S301 to S303 are executed. Steps S301 to S303 are the same as steps S201 to S203 shown in FIG. 4, respectively.

Subsequently, in step S304, the terminal device 200a transmits a game service request and an operation request to the determination server 500. This game service request includes the result of the determination for the terminal device 200a made by the quality control apparatus 100. The operation request indicates identification information of the terminal device 300a. The identification information of the terminal device 300a is information specifying a terminal device used by an opponent of the user of the terminal device 200a.

Subsequently, in step S305, the information communicator 241b receives the game service request and the operation request from the terminal device 200a.

Subsequently, in step S306, the information communicator 241b transmits an inquiry request to the terminal device 300a indicated in the operation request. The contents of the inquiry request in step S306 are similar to the contents of the inquiry request shown in step S101 in FIG. 2.

Thereafter, steps S307 to 309 are executed. Steps S307 to 309 are similar to steps S102 to S104 shown in FIG. 2, respectively.

Subsequently, in step S310, the terminal device 300a transmits a game service request to the determination server 500. This game service request includes the result of the determination for the terminal device 300a made by the quality control apparatus 100.

Subsequently, in step S311, the information communicator 241b receives the game service request from the terminal device 200a.

A terminal device, which is different from both the terminal device 200a and the terminal device 300a, may transmit an operation request, which is indicative of both identification information of the terminal device 200a and the identification information of the terminal device 300a, to the determination server 500. In this case, the information communicator 241b in the determination server 500 transmits an inquiry request to each of the terminal device 200a and the terminal device 300a. When the operation request indicates a time at which the inquiry request should be transmitted, the information communicator 241b transmits the inquiry request at the time at which the inquiry request should be transmitted.

Subsequently, in step S312, the determiner 242a executes the group determination. The method of the determination made by the determiner 242a in the group determination is similar to the method of the determination made by the determiner 242a in the first modification (the method of the determination made by the determiner 242a in the matching determination).

Subsequently, the situation controller 343b generates a piece of notification information based on the result of the group determination for each terminal device in the first group G1a. Therefore, the pieces of notification information correspond one-to-one with the terminal devices belonging to the first group G1a. The contents of the piece of notification information are similar to the contents of the piece of notification information in the first modification.

Subsequently, in step S313, the situation controller 343b transmits the piece of notification information to the terminal device in the first group G1a via the communication device 220a. Step S313 is an operation in which the situation controller 343b transmits the piece of notification information corresponding to the terminal device 200a to the terminal device 200a.

Subsequently, steps S314 and S315 are executed. Steps S314 and S315 are similar to steps S115 and S116 in FIG. 2, respectively.

Subsequently, step S316 is executed. Step S316 is an operation in which the situation controller 343b transmits the piece of notification information corresponding to the terminal device 300a to the terminal device 300a.

Subsequently, steps S317 and S318 are executed. Steps S317 and S318 are similar to steps S113 and S114 in FIG. 2, respectively.

Steps S316 to 318 may be executed during a period between step S312 and step S313.

Thereafter, the situation controller 243b provides the terminal device 200a and the terminal device 300a with the online competition game service via the network NW.

The situation controller 243b confirms whether both the fourth notification information corresponding to the terminal device 200a and the fourth notification information corresponding to the terminal device 300a indicate the same identifier (the identifier of the second group G2).

Based on the same identifier (the identifier of the second group G2) being indicated, the situation controller 243b provides the online competition game service for the terminal device 200a and the terminal device 300a.

B23: Summary of Second Modification

According to the second modification, in a situation in which the user of the terminal device 200a and the user of the terminal device 300a have previously agreed to play the online competition game through the server, it is possible for each terminal device to receive a communication service at a quality higher than or equal to the predetermined quality.

B3: Third Modification

B31: Configuration of Third Modification

Figure 7:
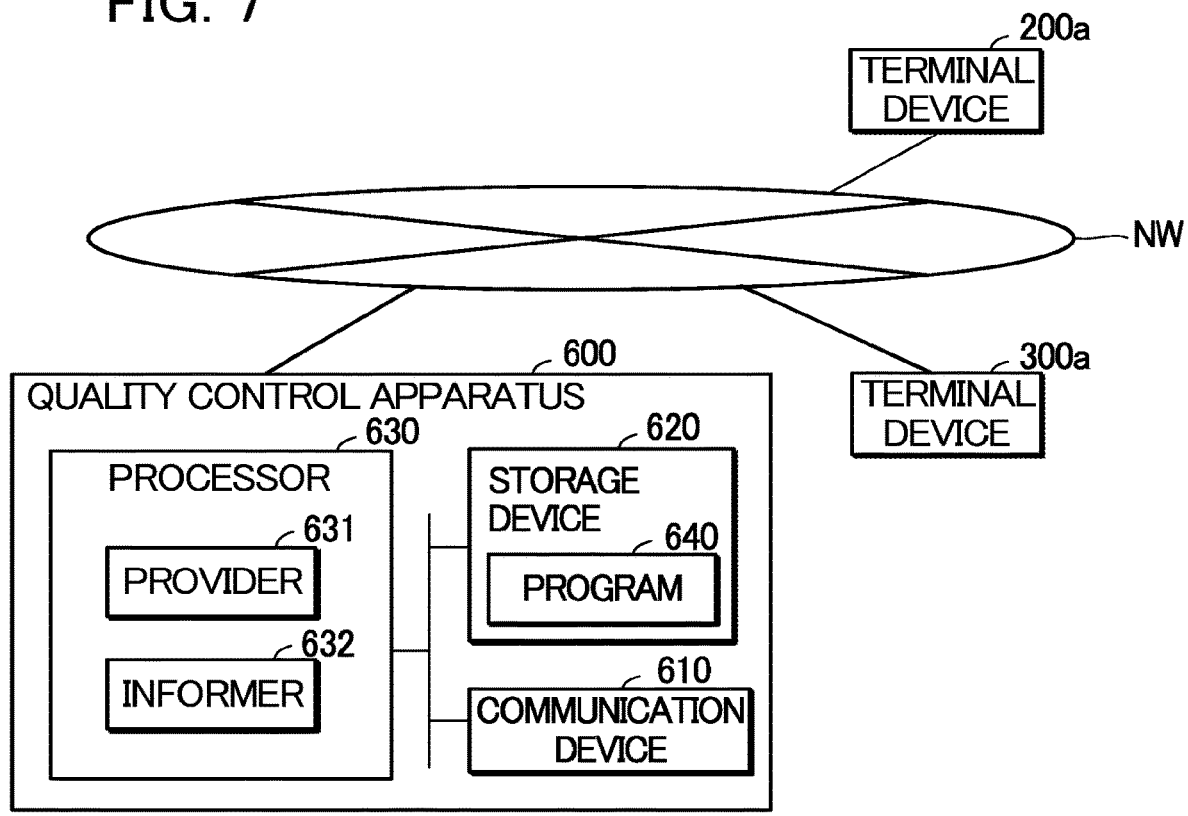
FIG. 7 is a diagram showing a third modification.

FIG. 7 is a view showing a third modification. Main differences between the third modification and the first embodiment are as follows. In the third modification, a quality control apparatus 600 is used instead of the quality control apparatus 100. In the third modification, the terminal device 200a is used instead of the master terminal device 200. In the third modification, the terminal device 300a is used instead of the slave terminal device 300.

The quality control apparatus 600 belongs to the network NW. The quality control apparatus 600 provides a terminal device, which satisfies a participation condition for an event requiring the QoS control service, with the QoS control service at a quality higher than or equal to a recommended quality that is recommended for the event. The event is, for example, an online competitive game contest. The event is not limited to the online competitive game contest. The event may be an online presentation, a teleconference, or a video conference, for example.

The quality control apparatus 600 includes a communication device 610, a storage device 620, and a processor 630. Elements of the quality control apparatus 600 are interconnected via one or more buses. Each element of the quality control apparatus 600 is constituted by one or more devices. One or some of the elements of the quality control apparatus 600 may be omitted.

The communication device 610 communicates with each of the terminal device 200a and the terminal device 300a via the network NW.

The storage device 620 is a recording medium readable by the processor 630. The storage device 620 includes, for example, a nonvolatile memory and a volatile memory. The storage device 620 stores a program 640 and the participation conditions for the event.

The processor 630 includes, for example, one or more processors. For example, the processor 630 includes one or more CPUs. One, some, or all of the functions of the processor 630 may be implemented by a circuit such as a DSP, an ASIC, a PLD, an FPGA, etc.

The processor 630 reads the program 640 from the storage device 620. The processor 630 executes the program 640 to realize a provider 631 and an informer 632.

The provider 631 communicates with the terminal device 200a and the terminal device 300a via the communication device 610. The provider 631 reads the participation condition for the event from the storage device 620. Based on a terminal device satisfying the participation condition for the event, the provider 631 is configured to provide the terminal device with the QoS control service at a quality higher than or equal to the recommended quality that is recommended for the event.

The participation condition includes, for example, a time zone, a place, and a requested level (for example, Level X) for the quality of the QoS control service. The participation condition is not limited to a combination of the time zone, the place, and the requested level, and the participation condition may be changed as needed. For example, the participation condition may include kind of terminal device, color of the terminal device, or age of a user of the terminal device, depending on the contents of the event.

The participation condition is set, for example, by an organizer of the event. For example, the organizer of the event registers a participation condition in a portal site of the QoS control service. A manager of the QoS control service confirms the participation condition registered in the portal site. When the participation condition has no problem, the manager of the QoS control service stores the participation condition in the storage device 620.

Based on a terminal device satisfying the participation condition, the informer 632 is configured to inform the terminal device, through the communication device 610, that the provider 631 provides the terminal device with the QoS control service at a quality higher than or equal to the recommended quality.

B32: Operation of Third Modification

Figure 8:
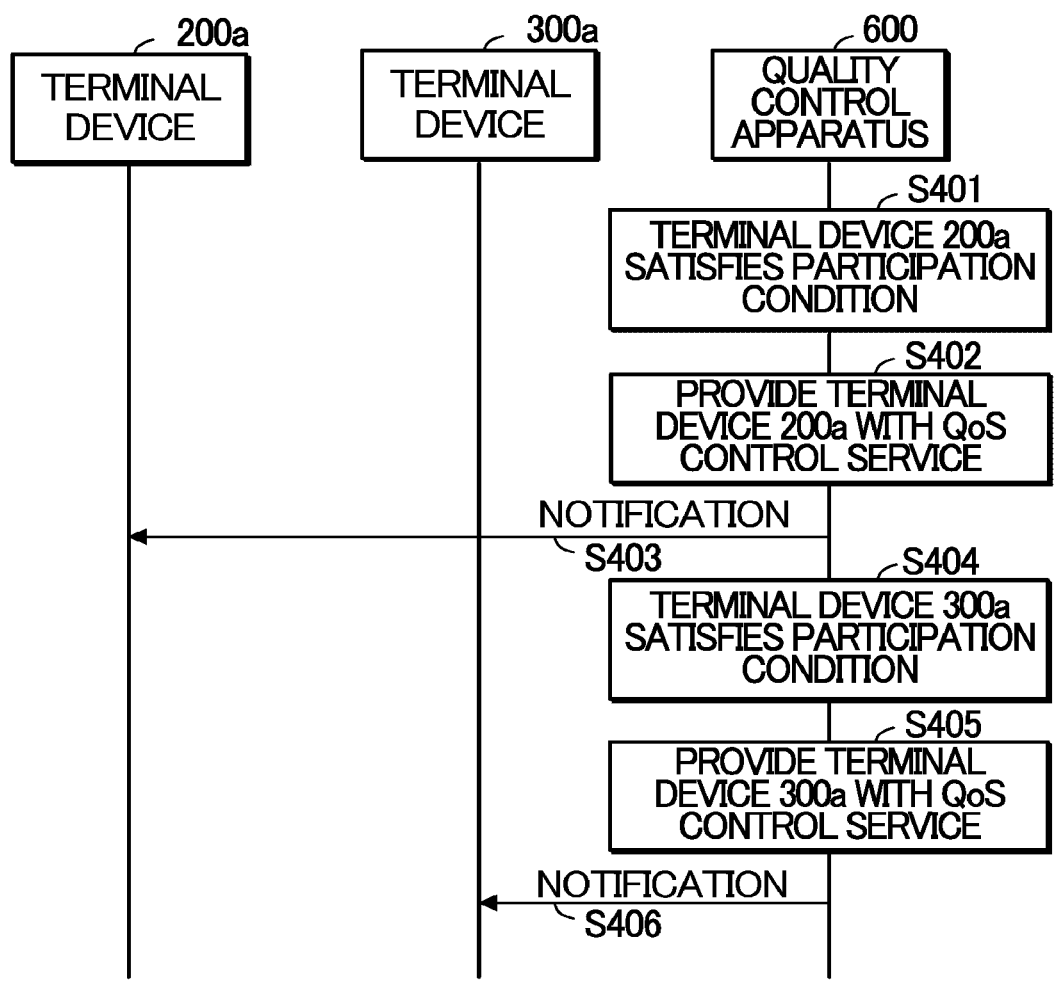
FIG. 8 is a sequence diagram showing an operation of the third modification.

FIG. 8 is a sequence diagram showing an operation of the third modification.

The provider 631 determines whether the terminal device 200a satisfies the participation condition for the event. For example, when the participation condition is constituted by a communication area, in which a terminal device is located, and a time zone, the provider 631 determines, based on a communication area in which the terminal device 200a is located and the time zone, whether the terminal device 200a satisfies the participation condition.

When the provider 631 determines that the terminal device 200a satisfies the participation condition in step S401, the provider 631 provides the terminal device 200a with the QoS control service at a quality higher than or equal to the recommended quality that is recommended for the event in step S402, Subsequently, in step S403, the informer 632 informs the terminal device 200a that the provider 631 provides the terminal device 200a with the QoS control service at a quality higher than or equal to the recommended quality. The terminal device 200a displays the informed contents. Therefore, the user of the terminal device 200a can recognize that the QoS control service is received at a quality higher than or equal to the recommended quality.

Subsequently, the provider 631 determines whether the terminal device 300a satisfies the participation condition. When the provider 631 determines that the terminal device 300a satisfies the participation condition in step S404, the provider 631 provides the terminal device 300a with the QoS control service at a quality higher than or equal to the recommended quality recommended in the event in step S405.

Subsequently, in step S406, the informer 632 informs the terminal device 300a that the provider 631 provides the terminal device 300a with the QoS control service at a quality higher than or equal to the recommended quality. The terminal device 300a displays the informed contents. Therefore, the user of the terminal device 300a can recognize that the QoS control service is received at a quality higher than or equal to the recommended quality.

Thereafter, the user of the terminal device 200a causes the terminal device 200a to execute P2P communication between the terminal device 200a and the terminal device 300a in order to compete against the user of the terminal device 300a in the online competition game. When the game server provides the online competition game service, the terminal device 200a and the terminal device 300a communicate with the game server.

Even when the terminal device 200a receives the notification from the informer 632, there is a probability that the QoS control service cannot be received at a quality higher than or equal to the recommended quality in a case in which the terminal device 200a is located in a place in which it is difficult for radio waves to reach or in a case in which congestion occurs in communication.

Therefore, after receiving the notification from the informer 632, the terminal device 200a may inquire of the quality control apparatus 600 whether the QoS control service is available at a quality higher than or equal to the recommended quality. When the response to the inquiry indicates that the QoS control service is not available at a quality higher than or equal to the recommended quality, the user of terminal device 200a moves to receive the QoS control service at a quality higher than or equal to the recommended quality, for example.

B33: Summary of Third Modification

According to the third modification, the quality control apparatus 600 belonging to the network NW enables each terminal device to receive a communication service at a quality higher than or equal to the predetermined quality.

C: Other Matters (1) In each of the first embodiment and the first through the third modifications, the storage devices 230, 230a, and 620 may include flexible disks, magneto-optical disks (e.g., compact disks, digital multi-purpose disks, Blu-ray (registered trademark) discs, smart-cards, flash memory devices (e.g., cards, sticks, key drives), Compact Disc-ROMs (CD-ROMs), registers, removable discs, hard disks, floppy (registered trademark) disks, magnetic stripes, databases, servers, or other suitable storage mediums. The program may be transmitted from a network via telecommunication lines.

(2) Each of the first embodiment and the first to third modifications may be applicable to at least one of systems using Long Term Evolution (LTE), LTE-advanced (LTE-A), SUPER 3G, IMT-Advanced, 4th generation mobile communication system (4G), 5th generation mobile communication system (5G), future radio access (FRA), W-CDMA (registered trademark), GSM (registered trademark), CDMA2000, Ultra Mobile Broadband (UMB), IEEE 802.11 (Wi-Fi), IEEE 802.16 (WiMAX (registered trademark)), IEEE 802.20, Ultra-wideband (UWB), Bluetooth (registered trademark), and other appropriate systems, and/or next-generation systems extended based on the system.

(3) The information, etc., described in each of the first embodiment and the first through the third modifications may be presented by use of various techniques. For example, data, information, bits, etc., which may be referred to throughout the above description, may be represented by voltages, currents, electromagnetic waves, magnetic fields, magnetic particles, light fields, photons, or any combination thereof. It should be noted that the terms described in this specification and/or terms necessary for understanding this specification may be replaced by terms having the same or similar meanings.

(4) In each of the first embodiment and the first through the third modifications, input and/or output information, etc., may be stored in a specific location (e.g., memory) or may be managed by use of a management table. The information, etc., that is input and/or output may be overwritten, updated, or appended. The information, etc., that is output may be deleted. The information, etc., that is input may be transmitted to other devices.

(5) In each of the first embodiment and the first through the third modifications, determination may be made based on values that can be represented by one bit (0 or 1), may be made based on Boolean values (true or false), or may be made based on comparing numerical values (for example, comparison with a predetermined value).

(6) The order of processes, sequences, flowcharts, etc., that have been used to describe the first embodiment and the first through the third modifications may be changed as long as they do not conflict. For example, although a variety of methods has been illustrated in this disclosure with a variety of elements of steps in exemplary orders, the specific orders presented herein are by no means limiting.

(7) Each function illustrated in FIG. 1, 3, 5, or 7 is implemented by any combination of hardware and software. Each function may be implemented by a single device, or may be implemented by two or more separate devices.

(8) The programs illustrated in each of the first embodiment and the first through the third modifications should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names.

Software, instructions, etc., may be transmitted and received via a transmission medium. For example, when the software is transmitted from a website, a server, or other remote sources using wired technology, such as a coaxial cable, fiber optic cable, twisted pair cable, or digital subscriber line (DSL), and/or wireless technology, such as infrared, wireless, or microwave technology, these wired and/or wireless technologies are included within the definition of the transmission medium.

(9) In each of the first embodiment and the first through the third modifications, the terms "system" and "network" are used interchangeably.

(10) In each of the first embodiment and the first through the third modifications, the master terminal device 200, the slave terminal device 300, the terminal device 200a, and the terminal device 300a may be each a mobile station. Those skilled in the art may refer to a mobile station as a subscriber station, mobile unit, subscriber unit, wireless unit, remote unit, mobile device, wireless device, wireless communicator, remote device, mobile subscriber station, access terminal, mobile terminal, wireless terminal, remote terminal, handset, user agent, mobile client, client, or other appropriate terms.

(11) In each of the first embodiment and the first through the third modifications, the phrase "based on" as used in this specification does not mean "based only on", unless specified otherwise. In other words, the phrase "based on" means both "based only on" and "based at least on."

(12) Any reference to an element using the designations "first", and "second", etc., used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(13) As long as terms such as "include", "comprise" and modifications thereof are used in each of the first embodiment and the first through third modifications, these terms are intended to be inclusive, in a manner similar to the way the term "provide" is used. In addition, the term "or" used in the specification or in claims is not intended to be an exclusive OR.

(14) In the disclosure, for example, when articles such as "a", "an", and "the" in English are added in translation, these articles include plurals unless otherwise clearly indicated by the context.

(15) The term "device" in this specification may be understood as another term such as a circuit, a device or a unit, etc.

(16) It is obvious to those skilled in the art that the present invention is not limited to the embodiments described in the specification. The present invention can be implemented in modified and altered modes without departing from the spirit and scope of the present invention defined in accordance with the claims. Consequently, the description in this specification is provided only for the purpose of explaining examples and should by no means be construed to limit the present invention in any way. In addition, a plurality of modes selected from the modes illustrated the specification may be used in combination.

D: Aspects Derivable from the Embodiment and the Modifications Described Above

The following configurations are derivable from at least one of the embodiment and the modifications described above.

D1: First Aspect

A management apparatus according to a first aspect includes a receiver, a determiner, and a situation controller. The receiver is configured to receive, for each of a plurality of terminal devices belonging to a first group, a corresponding piece of quality information based on a quality available to the respective terminal device in a communication service. The determiner is configured to determine, based on the corresponding piece of quality information for each of the plurality of terminal devices, whether the first group includes a second group of two or more terminal devices, the second group satisfying a predetermined condition, the predetermined condition including a quality condition in which the communication service is available at a quality higher than or equal to a predetermined quality. The situation controller is configured to, based on a result of a determination made by the determiner being affirmative, cause a first situation in which the second group receives the communication service at a quality higher than or equal to the predetermined quality. According to this aspect, it is possible for two or more terminal devices to receive a communication service at a quality higher than or equal to a predetermined quality.

D2: Second Aspect

In an example (second aspect) of the first aspect, the predetermined quality is a recommended quality that is recommended in a case in which the communication service is used in a second situation, or a quality that is lower than the recommended quality by a predetermined level. According to this aspect, it is possible for two or more terminal devices to receive a communication service at a quality higher than or equal to the recommended quality or at a quality lower than the recommended quality by a predetermined level.

D3: Third Aspect

In an example (third aspect) of the second aspect, the predetermined quality is the recommended quality, and the first situation is a situation in which the second group receives the communication service at the recommended quality. According to this aspect, it is possible for two or more terminal devices to receive a communication service at the recommended quality. Therefore, it is possible to adjust communication environments of the two or more terminal devices.

D4: Fourth Aspect

In an example (fourth aspect) of the first aspect or the second aspect, the first situation is a situation in which the second group receives the communication service at a lowest quality from among qualities of the communication service available to the second group. According to this aspect, it is possible to adjust communication environments of the two or more terminal devices to be as high a quality as possible.

D5: Fifth Aspect

In an example (fifth aspect) of any one of the first to the fourth aspects, the predetermined condition further includes a condition in which a number of two or more terminal devices belonging to the second group is greater than or equal to a predetermined number. The predetermined number is less than or equal to a number of terminal devices belonging to the first group. According to this aspect, it is possible to assist provision of a communication service at a quality higher than or equal to a predetermined quality when terminal devices, of which number is greater than or equal to the predetermined number, are capable of receiving the communication service at a quality higher than or equal to a predetermined quality.

D6: Sixth Aspect

In an example (sixth aspect) of any one of the first to the fifth aspects, the plurality of terminal devices belonging to the first group is capable of using a specific service requiring the communication service, and the situation controller is configured to, based on the result of the determination being affirmative, further cause a situation in which the second group receives the specific service. According to this aspect, it is possible to cause a terminal device group to receive a specific service while causing the terminal device group to receive the communication service at a quality higher than or equal to the predetermined quality.

D7: Seventh Aspect

In an example (seventh aspect) of any one of the first to the sixth aspects, the managing apparatus is included in any one of the plurality of terminal devices belonging to the first group. According to this aspect, it is possible to reduce the number of components compared to a configuration in which the management apparatus is included in an apparatus different from any of the plurality of terminal devices.

D8: Eighth Aspect

In an example (seventh aspect) of any one of the first to the sixth aspects, the managing apparatus is included in a server configured to communicate with each of the plurality of terminal devices belonging to the first group. According to this aspect, it is possible to simplify the configuration of the terminal device compared with a configuration in which the management apparatus includes any one of a plurality of terminal devices.

D9: Ninth Aspect

In an example (ninth aspect) of any one of the first to the fifth aspects, the plurality of terminal devices belonging to the first group is capable of using a specific service requiring the communication service, and the situation controller is configured to further permit the second group to receive the specific service based on the result of the determination being affirmative. According to this aspect, the second group is permitted to receive the specific service.

D10: Tenth Aspect

A quality control apparatus according to a tenth aspect includes a provider and an informer. The provider is configured to provide, based on a terminal device satisfying a participation condition for an event requiring a communication service, the terminal device with the communication service at a quality higher than or equal to a recommended quality that is recommended for the event. The informer configured to inform, based on the terminal device satisfying the participation condition, the terminal device that the provider provides the terminal device with the communication service at the quality higher than or equal to the recommended quality. According to this aspect, it is possible for a terminal device to receive a communication service at a quality higher than or equal to the predetermined quality.

DESCRIPTION OF REFERENCE SIGNS

100 . . . quality control apparatus, 200 . . . master terminal device, 210 . . . input and output device, 220 . . . communication device, 230 . . . storage device, 240 . . . processor, 241 . . . acquirer, 242 . . . determiner, 243 . . . situation controller, 244 . . . operation controller, 300 . . . slave terminal device, 400 . . . matching server, 500 . . . determination server, 600 . . . quality control apparatus, 631 . . . provider, 632 . . . informer.

The invention claimed is:

1. A management apparatus comprising:
a receiver configured to receive, for each of a plurality of terminal devices belonging to a first group, a corresponding piece of quality information based on a quality of a quality of service (QOS) control service available to the respective terminal device in the QoS control service, the QoS control service being a QoS control service for changing a quality of communication;
a determiner configured to determine, based on the corresponding piece of quality information for each of the plurality of terminal devices, whether the first group includes a second group of two or more terminal devices, the second group satisfying a predetermined condition, the predetermined condition including a quality condition in which the QoS control service with a quality higher than or equal to a predetermined quality is available; and
a situation controller configured to, based on a result of a determination made by the determiner being affirmative, cause a first situation in which the second group receives the QoS control service with a quality higher than or equal to the predetermined quality.

2. The management apparatus according to claim 1, wherein the predetermined quality is a recommended quality that is recommended in a case in which the QoS control service is used in a second situation, or a quality that is lower than the recommended quality by a predetermined level.

3. The management apparatus according to claim 2, wherein:
the predetermined quality is the recommended quality, and
the first situation is a situation in which the second group receives the QoS control service at the recommended quality.

4. The management apparatus according to claim 1, wherein the first situation is a situation in which the second group receives the QoS control service at a lowest quality from among qualities of the QoS control service available to the second group.

5. The management apparatus according to claim 1, wherein:
the predetermined condition further includes a condition in which a number of two or more terminal devices belonging to the second group is greater than or equal to a predetermined number, and
the predetermined number is less than or equal to a number of terminal devices belonging to the first group.

6. The management apparatus according to claim 1, wherein:
the plurality of terminal devices belonging to the first group is capable of using a specific service requiring the QoS control service, and
the situation controller is configured to, based on the result of the determination being affirmative, further cause a situation in which the second group receives the specific service.

7. The management apparatus according to claim 1, wherein the managing apparatus is included in any one of the plurality of terminal devices belonging to the first group.

8. The management apparatus according to claim 1, wherein the managing apparatus is included in a server configured to communicate with each of the plurality of terminal devices belonging to the first group.

9. The management apparatus according to claim 1, wherein:
the plurality of terminal devices belonging to the first group is capable of using a specific service requiring the QoS control service; and
the situation controller is configured to further permit the second group to receive the specific service based on the result of the determination being affirmative.

10. The management apparatus according to claim 2, wherein the first situation is a situation in which the second group receives the QoS control service at a lowest quality from among qualities of the QoS control service available to the second group.

11. The management apparatus according to claim 1, wherein the first group includes at least one slave terminal device, and the management apparatus and the slave terminal device provide both contract information and position information to a quality control apparatus which uses the contract information and position information to determine whether each device is capable of using a desired QoS level.

* * * * *